(12) United States Patent
Buckland et al.

(10) Patent No.: US 9,556,785 B2
(45) Date of Patent: *Jan. 31, 2017

(54) METHOD AND SYSTEM FOR BINARY FLOW TURBINE CONTROL

(71) Applicant: Ford Global Technologies, LLC, Dearborn, MI (US)

(72) Inventors: Julia Helen Buckland, Commerce Township, MI (US); Amey Y. Karnik, Canton, MI (US); Jeffrey Allen Doering, Canton, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,567

(22) Filed: Jul. 8, 2015

(65) Prior Publication Data

US 2015/0308359 A1 Oct. 29, 2015

Related U.S. Application Data

(63) Continuation of application No. 14/053,546, filed on Oct. 14, 2013, now Pat. No. 9,103,273.

(Continued)

(51) Int. Cl.
*F02B 37/18* (2006.01)
*F02B 37/22* (2006.01)
(Continued)

(52) U.S. Cl.
CPC ............. *F02B 37/183* (2013.01); *F02B 37/02* (2013.01); *F02B 37/025* (2013.01); *F02B 37/12* (2013.01); *F02B 37/18* (2013.01); *F02B 37/22* (2013.01); *F02D 13/02* (2013.01); *F02D 13/0215* (2013.01); *F02D 41/005* (2013.01); *F02D 41/0007* (2013.01); *F02D 41/0052* (2013.01); *F02D 41/022* (2013.01); *F02D 41/023* (2013.01); *F02D 41/04* (2013.01);

(Continued)

(58) Field of Classification Search
CPC ......... F02B 37/02; F02B 37/025; F02B 37/12; F02B 37/18; F02B 37/183; F02D 13/02; F02D 41/0007; F02D 41/005; F02D 41/022; F02D 41/023; F02D 41/062; F02D 2041/001; F02D 2200/0404; F02D 2200/1002; F02M 26/01; F02M 26/04; F02M 26/05; F02M 26/06; F02P 5/04; F02P 5/045; Y02T 10/144; Y02T 10/47

See application file for complete search history.

(56) References Cited

U.S. PATENT DOCUMENTS 3,614,259 A 10/1971 Neff
4,351,154 A 9/1982 Richter
(Continued)

FOREIGN PATENT DOCUMENTS

WO 9837320 A1 8/1998
WO 2004018863 A1 3/2004

*Primary Examiner* — Audrey K Bradley
(74) *Attorney, Agent, or Firm* — Julia Voutyras; Alleman Hall McCoy Russell & Tuttle LLP

(57) ABSTRACT

Methods and systems are provided for adjusting the opening of a scroll valve of a binary flow turbine. Scroll valve adjustments are used at different engine operating conditions to improve engine performance and boost response. Scroll valve adjustments are coordinated with wastegate and EGR valve adjustments for improved engine control.

18 Claims, 15 Drawing Sheets

Related U.S. Application Data

(60) Provisional application No. 61/833,377, filed on Jun. 10, 2013.

(51) Int. Cl.

| | | |
|---|---|---|
| *F02B 37/12* | (2006.01) | |
| *F02D 41/02* | (2006.01) | |
| *F02B 37/02* | (2006.01) | |
| *F02D 41/00* | (2006.01) | |
| *F02D 13/02* | (2006.01) | |
| *F02D 41/06* | (2006.01) | |
| *F02P 5/04* | (2006.01) | |
| *F02D 41/04* | (2006.01) | |

(52) U.S. Cl.
CPC ........... *F02D 41/062* (2013.01); *F02M 26/01* (2016.02); *F02M 26/04* (2016.02); *F02M 26/05* (2016.02); *F02M 26/06* (2016.02); *F02M 26/07* (2016.02); *F02P 5/04* (2013.01); *F02P 5/045* (2013.01); *F02D 2041/001* (2013.01); *F02D 2200/0404* (2013.01); *F02D 2200/1002* (2013.01); *Y02T 10/144* (2013.01); *Y02T 10/47* (2013.01)

(56) References Cited

U.S. PATENT DOCUMENTS

| | | |
|---|---|---|
| 4,389,845 A | 6/1983 | Koike |
| 4,443,153 A | 4/1984 | Dibelius |
| 4,544,326 A | 10/1985 | Nishiguchi et al. |
| 6,519,931 B2 | 2/2003 | Fujieda et al. |
| 6,941,755 B2 | 9/2005 | Bucknell et al. |
| 6,983,596 B2 | 1/2006 | Frankenstein et al. |
| 7,698,894 B2 | 4/2010 | Wood et al. |
| 7,922,618 B2 | 4/2011 | Matsubara et al. |
| 8,141,357 B2 | 3/2012 | Yamagata et al. |
| 8,201,406 B2 | 6/2012 | Kogo et al. |
| 9,103,272 B2 | 8/2015 | Buckland et al. |
| 2004/0050047 A1 | 3/2004 | Arnold |
| 2011/0118955 A1 | 5/2011 | Livshiz et al. |
| 2011/0146634 A1 | 6/2011 | Iwatani et al. |
| 2011/0302917 A1 | 12/2011 | Styles et al. |
| 2012/0060492 A1 | 3/2012 | Pursifull et al. |
| 2013/0014502 A1 | 1/2013 | Sato |
| 2014/0360179 A1 | 12/2014 | Doering et al. |
| 2014/0360180 A1 | 12/2014 | Doering et al. |
| 2014/0360182 A1 | 12/2014 | Boyer et al. |
| 2014/0360183 A1 | 12/2014 | Buckland et al. |
| 2014/0360185 A1 | 12/2014 | Boyer et al. |

METHOD AND SYSTEM FOR BINARY FLOW TURBINE CONTROL

CROSS REFERENCE TO RELATED APPLICATIONS

The present application is a continuation of U.S. patent application Ser. No. 14/053,546, entitled "METHOD AND SYSTEM FOR BINARY FLOW TURBINE CONTROL," filed on Oct. 14, 2013, which claims priority to U.S. Provisional Patent Application Ser. No. 61/833,377, entitled "METHOD AND SYSTEM FOR BINARY FLOW TURBINE CONTROL," filed on Jun. 10, 2013, the entire contents of each of which are hereby incorporated by reference for all purposes.

FIELD

The present application relates to controlling a scroll valve coupled to a binary flow turbine in a boosted engine system.

BACKGROUND AND SUMMARY

Engine out cold-start emissions generated before light-off of an exhaust system catalytic converter may contribute a large percentage of the total exhaust emissions. Various approaches may be used by engine control systems to expedite the attainment of the catalyst light-off temperature. For example, various combinations of valve overlap and increased fuel injection may be used to expedite catalyst warming. In addition, at low engine speeds following the cold-start, boost performance may be degraded due to turbo lag. In boosted engine systems including a twin-scroll turbocharger, such as the system of Styles et al. in US 2011/0302917, flow through the different scrolls of the turbocharger is separated to reduce turbo lag at low engine speeds.

However, the inventors herein have recognized potential issues with such an approach. Specifically, there may be selected engine operating conditions where separating flow through the scrolls of a twin-scroll turbocharger can increase turbine speed to a range that excites audible resonance at the turbocharger. This results in a condition known as turbo whine. The audible resonance may be objectionable to the vehicle driver and/or passengers. The turbine speed at which the resonance occurs may vary based on operating conditions such as engine speed, temperature, etc., the turbo whine may be exacerbated during low engine speed conditions, for example during engine start. This is due to the overall engine system noise not being sufficient to mask the audible resonance.

In one example, turbo whine may be at least partly addressed by a boosted engine system that uses a binary flow turbine. For example, turbo whine may be addressed by a method comprising: during selected engine start (e.g., engine start speed conditions) conditions, operating the engine with a scroll valve coupled to an outer scroll of a multi-scroll exhaust turbine open. Specifically for a start event, by opening the scroll valve during at least an early part of selected engine starts, turbine speed can be reduced, moving the turbocharger out of the resonance condition. During other starts, where no whine occurs, the engine may be started with the scroll valve closed for a number of combustion events.

In one example, during selected engine starts, such as where the turbine speed is within a threshold range, an engine may be started with a scroll valve coupled to an outer scroll of a multi-scroll exhaust turbine at a more open position, such as at a fully open position. The scroll valve may be maintained open for a number of combustion events during the engine start. By initially opening the scroll valve, exhaust manifold pressure upstream of the turbine is reduced, reducing turbine speed. This may move the turbine out of a speed range where resonance occurs, thereby reducing the objectionable noise. Then, after the number of combustion events, the scroll valve may be moved to a closed position to expedite turbine spool-up and catalyst warming. By subsequently closing the scroll valve, exhaust flowing to the turbine inlet is flowed at a higher pressure, expediting turbine spin-up and resulting turbine power. In addition, turbine surface area is reduced, increasing heat flux to the exhaust catalyst, and expediting catalyst light-off during the cold-start. It will be appreciated that wastegate and EGR valve adjustments may be coordinated with the scroll valve adjustment to further improve boost control during the engine start.

In this way, by opening the scroll valve during an early part of an engine start, turbine speed can be kept out of a range where turbo whine is likely. Then, by closing the scroll valve during a later part of the engine start, turbine spin-up and catalyst light-off is expedited. By reducing turbo whine, the vehicle operator's drive experience is improved. By expediting catalyst light-off, cold-start emissions are reduced. In addition, by expediting turbine spin-up, turbo lag at low engine speeds is reduced, and boosted engine performance is improved. Overall, engine performance and exhaust emissions are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
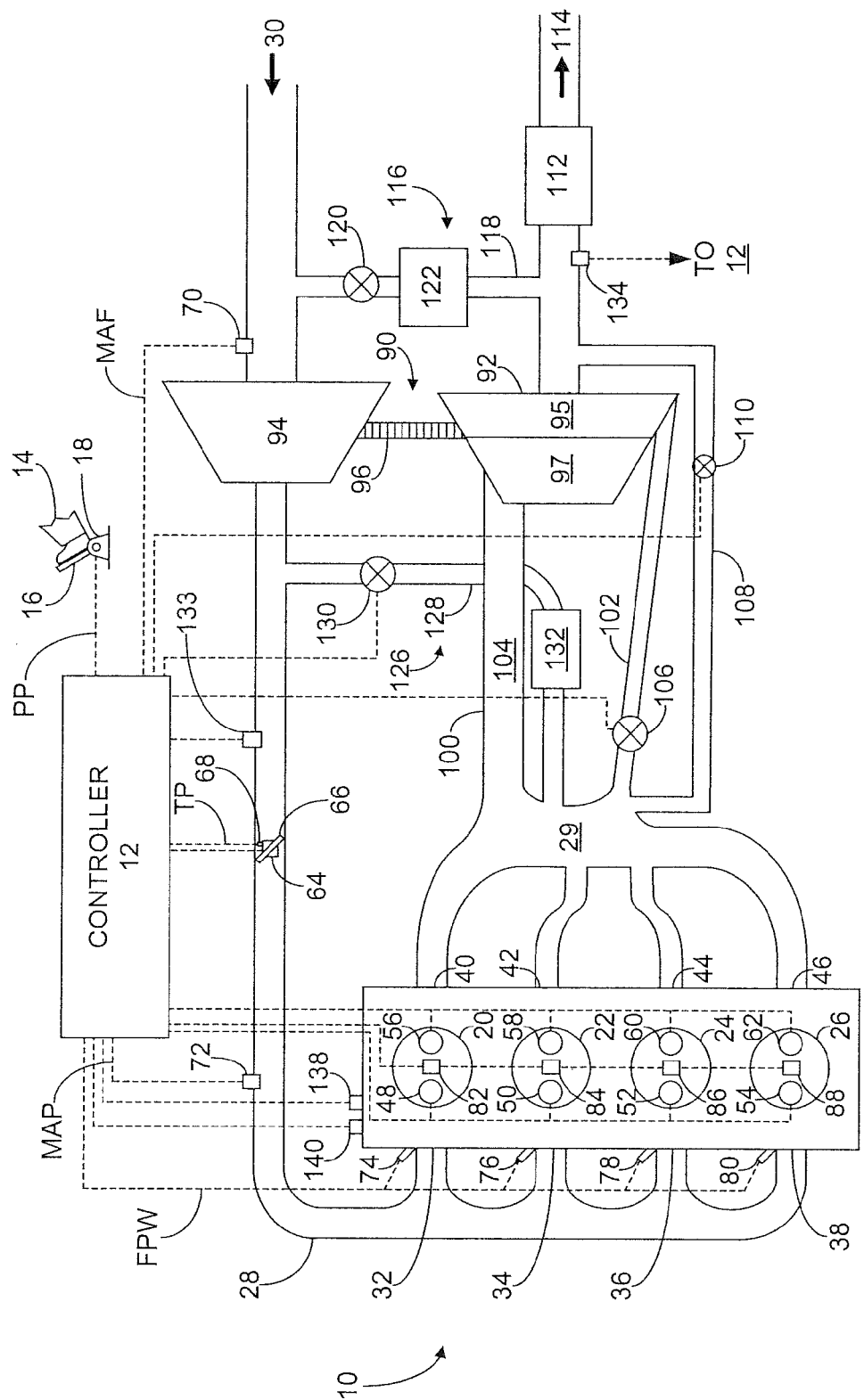
FIG. 1 shows a schematic diagram of a boosted engine system including a binary flow turbine and an exhaust gas recirculation (EGR) system.

The following description relates to systems and methods for operating a boosted engine including a binary flow turbine and an exhaust gas recirculation (EGR) system, as shown in FIG. 1. A controller may be configured to perform a routine, such as the routine of FIG. 5, to adjust a position of a scroll valve of the turbine (such as from an initial position) based on various engine operating conditions. Selection of an initial scroll valve schedule may be based on engine speed-load maps such as those shown at FIGS. 2-3. For example, the scroll valve position may be adjusted during engine starts (FIG. 6) to reduce engine start emissions and turbocharger whine. The valve position may be adjusted during torque transients (FIG. 7), such as a tip-in, to reduce turbo lag. The valve position may also be adjusted responsive to combustion stability limits (FIG. 8), abnormal combustion events (FIG. 9), and engine deactivation (FIG. 10). Various engine actuators may be adjusted based on the scroll valve adjustment, such as a turbine wastegate, VCT, spark, EGR valves, etc. For example, as elaborated at FIG. 11, torque disturbances associated with the scroll valve transition may be compensated for using concomitant adjustments to one or more engine actuators. The scroll valve adjustments may improve boost response (FIG. 4). Example scroll valve adjustments are described with reference to FIGS. 12-17. In this way, the horsepower capability of a turbocharged engine, and overall engine performance, can be improved during various engine operating conditions.

FIG. 1 shows a schematic diagram of an engine 10, which may be included in a propulsion system of an automobile. Engine 10 may be controlled at least partially by a control system including controller 12 and by input from a vehicle operator 14 via an input device 16. In this example, input device 16 includes an accelerator pedal and a pedal position sensor 18 for generating a proportional pedal position signal PP.

Engine 10 may include a plurality of combustion chambers (i.e., cylinders). In the example shown in FIG. 1, Engine 10 includes combustion chambers 20, 22, 24, and 26, arranged in an inline-4 configuration. It should be understood, however, that though FIG. 1 shows four cylinders, engine 10 may include any number of cylinders in any configuration, e.g., V-6, I-6, V-12, opposed 4, etc.

Though not shown in FIG. 1, each combustion chamber (i.e., cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 28 via an air intake passage 30. Intake manifold 28 may be coupled to the combustion chambers via intake ports. For example, intake manifold 28 is shown in FIG. 1 coupled to cylinders 20, 22, 24, and 26 via intake ports 32, 34, 36, and 38 respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold or exhaust passage.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake and exhaust valve may be operated by an intake cam and an exhaust cam. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor.

Intake passage 30 may include a throttle 64 having a throttle plate 66. In this particular example, the position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake passage 28 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

The combustion chambers of engine 10 may be operated in a compression ignition mode, with or without an ignition spark. In some examples, a distributorless ignition system (not shown) may provide ignition sparks to spark plugs coupled to the combustion chambers in response to controller 12. For example, spark plugs 82, 84, 86, and 88 are shown in FIG. 1 coupled to cylinders 20, 22, 24, and 26, respectively.

Engine 10 may include a turbocharger 90. Turbocharger 90 may include an exhaust turbine 92 and an intake compressor 94 coupled on a common shaft 96. The blades of exhaust turbine 92 may be caused to rotate about the common shaft as a portion of the exhaust gas stream discharged from engine 10 impinges upon the blades of the turbine. Intake compressor 94 may be coupled to turbine 92 such that compressor 94 may be actuated when the blades of turbine 92 are caused to rotate. When actuated, compressor 94 may then direct pressurized gas to air intake manifold 28 from where it may then be directed to engine 10. In this way, turbocharger 90 may be configured for providing a boosted aircharge to the engine intake.

Turbocharger 90 may be configured as a multi-scroll turbocharger wherein the exhaust turbine includes a plurality of scrolls. In the depicted embodiment, turbine 92 includes two scrolls including a first outer scroll 95 and a second inner scroll 97. Each scroll may receive exhaust gas from exhaust manifold 29 via distinct inlets. Specifically, exhaust gas may flow along a first exhaust gas entry path 102 into first outer scroll 95 and along a second exhaust gas entry path 104 into second inner scroll 97. A scroll valve 106 may be coupled in first exhaust gas entry path 102 between engine exhaust manifold 29 and an inlet of the first outer scroll 95. In this way, exhaust turbine 92 is configured as a binary flow turbine. As elaborated below, by adjusting a position of the scroll valve 106, an amount of exhaust gas directed to the turbine can be varied. As such, the scroll valve is not coupled to an inlet of the second inner scroll.

A wastegate 110 may be coupled across turbine 92. Specifically, wastegate 110 may be included in a bypass 108 coupled between an inlet and outlet of the exhaust turbine. By adjusting a position of wastegate 110, an amount of boost provided by the turbine may be controlled.

Exhaust gases exiting turbine 92 and/or wastegate 110 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or more of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include one or more exhaust gas recirculation (EGR) systems for recirculating an amount of exhaust gas exiting engine 10 back to the engine intake. For example, engine 10 may include a first, low pressure EGR (LP-EGR) system 116 for recirculating a portion of exhaust gas from the exhaust manifold to the intake manifold, specifically, from the engine exhaust, downstream of turbine 92, to the engine intake, upstream of compressor 94. The LP-EGR system may include an LP-EGR conduit 118, an LP-EGR valve 120 configured to control an amount of exhaust gas recirculated along LP-EGR conduit 118, and an LP-EGR cooler 122 for cooling the exhaust gas before delivery to the intake.

Engine 10 may further include a second, high pressure EGR (HP-EGR) system 126 for recirculating a portion of exhaust gas from the exhaust manifold to the intake manifold, specifically, from the engine exhaust, upstream of turbine 92, to the engine intake, downstream of compressor 94. The HP-EGR system may include an HP-EGR conduit 128, an HP-EGR valve 130 configured to control an amount of exhaust gas recirculated along HP-EGR conduit 128, and an HP-EGR cooler 132 for cooling the exhaust gas before delivery to the intake.

In some examples, controller 12 may be a conventional microcomputer including: a microprocessor unit, input/output ports, read-only memory, random access memory, keep alive memory, and a conventional data bus. Controller 12 is shown in FIG. 1 receiving various signals from sensors coupled to engine 10, in addition to those signals previously discussed, including: engine coolant temperature (ECT) from a temperature sensor 138; an engine position sensor 140, e.g., a Hall effect sensor sensing crankshaft position. Barometric pressure may also be sensed (sensor not shown) for processing by controller 12. In some examples, engine position sensor 140 produces a predetermined number of equally spaced pulses every revolution of the crankshaft from which engine speed (RPM) can be determined. Additionally, various sensors may be employed to determine turbocharger boost pressure. For example, a pressure sensor 133 may be disposed in the engine intake downstream of compressor 94 to determine boost pressure. Additionally, at least the exhaust passage routing exhaust to outer scroll 95 may include various sensors for monitoring operating conditions of the multi-scroll turbocharger. Exhaust gas sensor 134 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Based on the input from the various sensors, controller 12 may be configured to perform various control routines (such as those described with reference to FIGS. 5-11) and actuate one or more engine actuators. The actuators may include, for example, intake throttle 64, EGR valves 120 and 130, wastegate 110, and scroll valve 106.

As such, by adjusting scroll valve 106 based on engine operating conditions, the turbine may be operated in different modes, and the dynamic range over which boost can be provided by the turbocharger is enhanced. For example, the turbocharger may be operated in a first mode with the scroll valve closed (e.g., fully closed) during selected conditions, such as at low engine speeds, during engine cold-starts, and in response to an increased demand for torque. When operating in the first mode with the scroll valve closed, the turbine behaves like a small mono-scroll turbine, providing faster spin-up and BMEP. Herein, the closing of the scroll valve shuts off exhaust flow to the first scroll. The resulting limited flow of exhaust through only one of the scrolls increases exhaust manifold pressure and turbine inlet pressure (and engine backpressure). By raising the pressure of exhaust flowing through the turbine, turbine speed and power in increased, particularly when the engine is operating at low speeds and during transient performance. When coordinated with adjustments to the wastegate, as well as one or both EGR systems (to provide cooled EGR benefits), the time to desired torque and turbine spin-up can be substantially improved.

As another example, the turbocharger may be operated in a second mode with the scroll valve open (e.g., fully open) during selected conditions. When operating in the second mode with the scroll valve open, the turbine behaves like a large mono-scroll turbine, providing improved peak power. Herein, the opening of the scroll causes exhaust to flow through both the first and second scroll. The resulting drop in exhaust manifold pressure allows more fresh air to be drawn into the engine intake. The increased flow of exhaust through the turbine also increases the driving of the turbine. When coordinated with adjustments to the wastegate, as well as one or both EGR systems, boosted engine performance is improved, a stoichiometric window is enlarged and the fuel economy benefits of cooled EGR are achieved. Example scroll valve adjustments responsive to operating conditions are described with reference to the routines of FIGS. 5-11 and with reference to the examples of FIGS. 12-17.

While the above modes describe the scroll valve as being either fully open or fully closed, it will be appreciated that in still other modes, the scroll valve may be adjusted to any (variable) position between the fully open and fully closed states, based on engine operating conditions. For example, based on engine operating conditions, the scroll valve may be opened or closed incrementally (e.g., in 20% increments).

Figure 2:
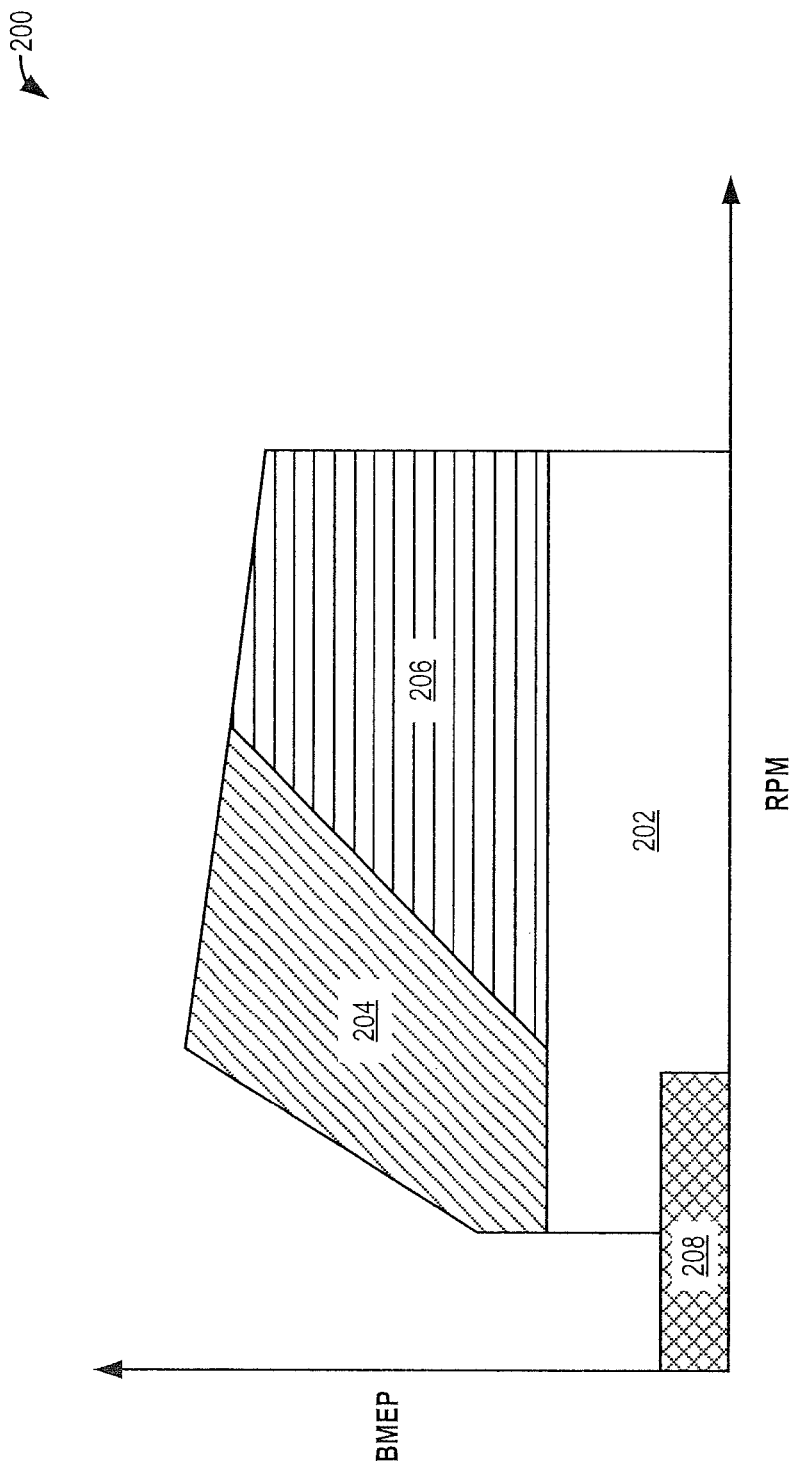
FIGS. 2-3 show example maps of engine operating conditions that may be used to determine when to transition the binary flow turbine of FIG. 1 between one scroll or two scroll configurations.

Now turning to FIG. 2, map 200 depicts an example scroll valve schedule (and coordination with a wastegate schedule) that may be implemented to optimize fuel economy and torque production during boosted engine operation. The map depicts speed-load regions wherein the scroll valve may be operated closed versus where the scroll valve may be operated open. Specifically, map 200 shows engine speed along the x-axis and engine load (as BMEP) along the y-axis.

As shown, when operating in a first region 202, defined by low load conditions (at low speed as well as at high speed), the engine may be operated with the scroll valve open as well as the wastegate open. By opening the scroll valve during the low speed-low load conditions the engine pumping losses can be reduced by reducing the exhaust manifold pressure.

In comparison, when operating in a second region 204, defined by low speed and high load conditions, the engine may be operated with the scroll valve closed. By closing the scroll valve during the high load conditions, exhaust flow may be restricted to only the inner scroll of the turbine. As a result, turbine inlet pressures may be increased, reducing turbo lag and improving low speed transient performance.

During high speed and high load conditions, such as when the engine is operating in third region 206, the engine may be operated with the scroll valve open and the wastegate partially or fully closed. By opening the scroll valve while closing the wastegate during the high speed and high load conditions, a larger portion of exhaust flow may be directed to both the scrolls to expedite turbine spin-up and boost delivery. As a result, turbine inlet pressure is reduced, reducing engine backpressure and improving fuel efficiency.

During cold-start conditions, such as when operating in fourth region 208, the engine may be started with the scroll valve closed and exhaust flow directed through only one of the scrolls. By closing the scroll valve during at least an early portion of an engine start operation, catalyst warming to light-off temperatures can be improved. Specifically, by closing the scroll valve during the cold-start, and restricting exhaust gas flow to be through only one of the multiple scrolls, thermal losses at the turbine (through part of the turbine housing and a portion of the turbine wheel) are reduced. As such, this allows a higher exhaust gas temperature to be retained, the higher exhaust gas temperature then directed to the exhaust catalyst.

During the cold-start conditions, the wastegate may be open or closed, depending on the prevalent engine operating conditions, so as to maximize the temperature of exhaust gas directed to the catalyst and/or optimize turbo speed for NVH. For example, during an engine cold-start the engine may be started with the scroll valve closed and the wastegate closed to increase the temperature of exhaust gas directed to the catalyst. As another example, during an engine cold-start the engine may be started with the scroll valve closed and the wastegate open to increase the temperature of exhaust gas directed to the catalyst by minimizing the heat transfer to the exhaust components. In some embodiments, additional combustion strategies may be implemented with the scroll valve and wastegate adjustments to reduce time to catalyst light-off. For example, retarded spark ignition timing and valve timing adjustments can be used to complement the reduced exhaust temperature losses associated with the closed scroll valve.

Figure 3:
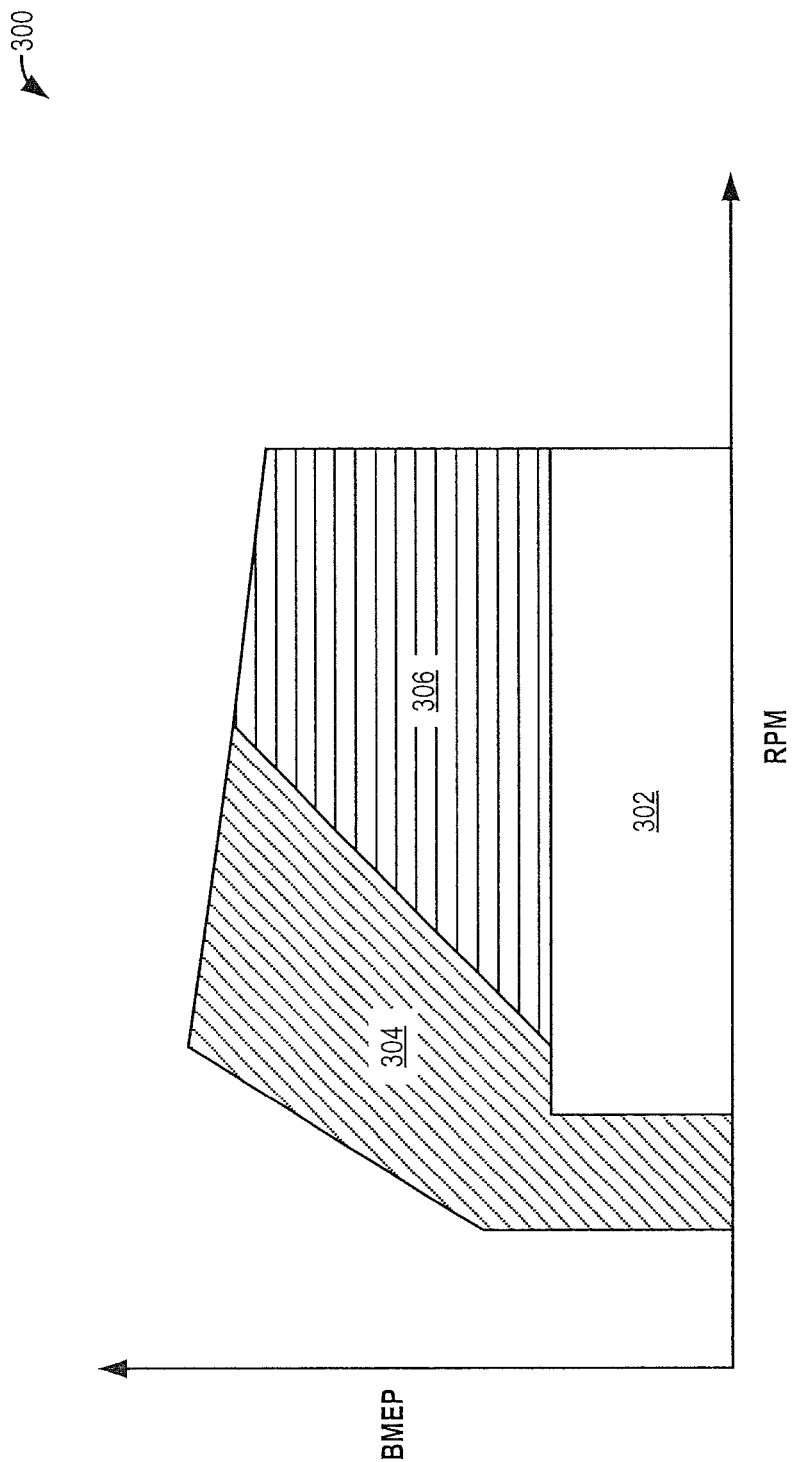
Figure 4:
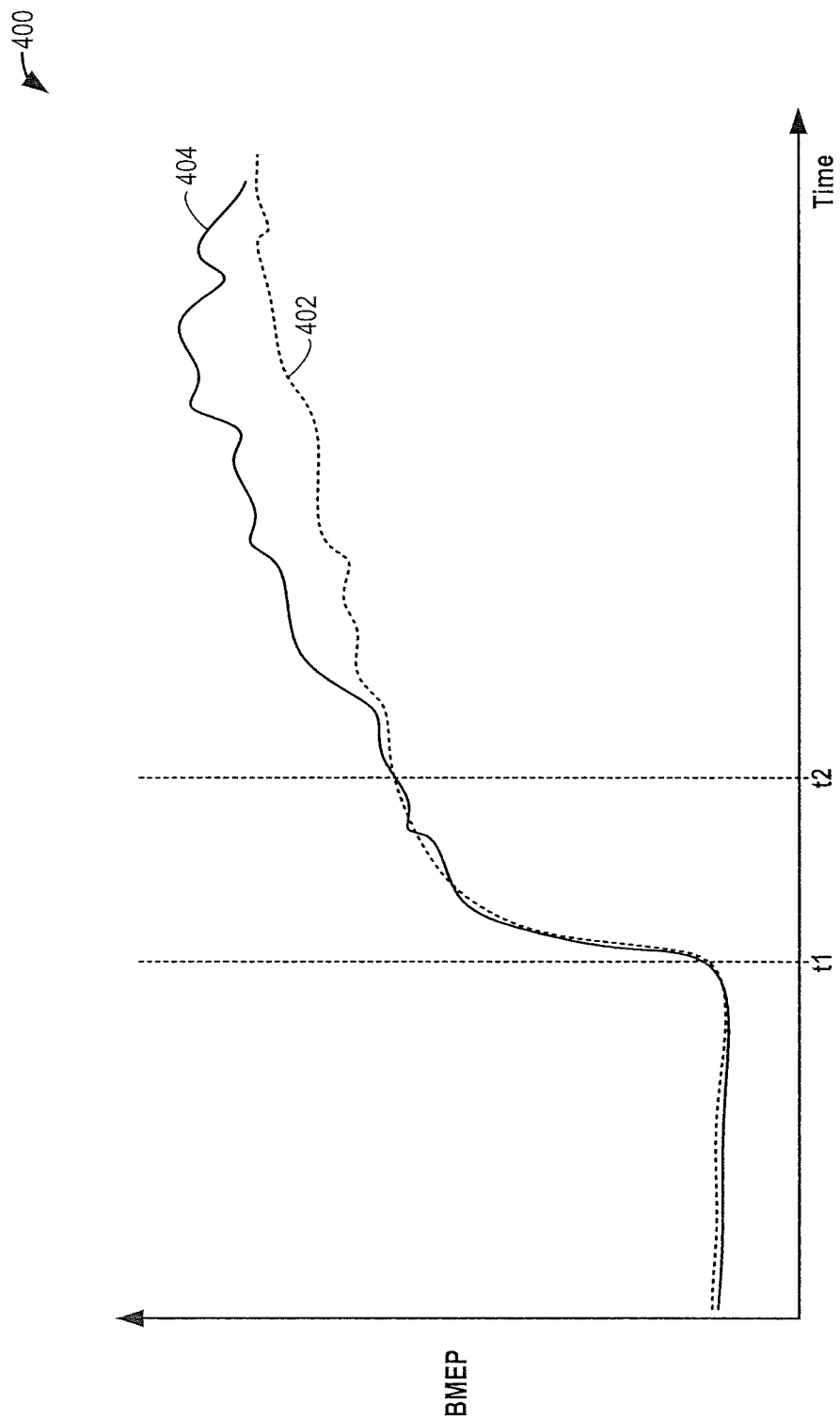
FIG. 4 shows a map depicting differences in transient torque response when operating the binary flow turbine of FIG. 1 with one or two scrolls.

Map 300 of FIG. 3 depicts an alternate scroll valve schedule that may be implemented to optimize fuel economy and torque production during boosted engine operation. As with the map of FIG. 2, map 300 depicts speed-load regions (with engine speed shown along the x-axis and engine load (as BMEP) shown along the y-axis) wherein the scroll valve may be operated closed versus where the scroll valve may be operated open.

In the depicted map, when operating in a first region 302, defined by low load conditions (at medium to high speeds), the engine may be operated with the scroll valve open as well as the wastegate open. By opening the scroll valve and the wastegate during the low load conditions, exhaust manifold pressure and engine pumping losses are minimized while meeting demanded engine torque.

In comparison, when operating in a second region 304, defined by low speed conditions, including low load and high load conditions, the engine may be operated with the scroll valve closed. By closing the scroll valve during the low speed-low load conditions, turbocharger transient response from a low load to a high load condition can be improved.

For example, during a transient increase in torque demand (e.g., a tip-in or a change in speed-load conditions from operating region 302 to 304, or from 202 to 204), where the torque request increases beyond a calibratable threshold, the scroll valve may be commanded closed. This improves turbocharger response and results in a faster delivery of torque. This action may be coordinated with the wastegate, with the wastegate moved towards a closed position when the scroll valve is closed to further improve turbocharger response. Alternatively, the wastegate may be used to initially manage the residuals (e.g., by initially being opened) and then be closed to facilitate boost production. Further still, the scroll valve and the wastegate may be coupled (electrically or mechanically) such that they close or open together.

As with the schedule of FIG. 2, during high speed and high load conditions, such as when the engine is operating in third region 306, the engine may be operated with the scroll valve open and the wastegate partially or fully closed. In 302, neither the scroll valve nor the wastegate needs to be closed to meet required boost for engine torque demand. In region 306, some closing of the wastegate is required to meet demanded torque but the torque demand can be met with an open scroll valve. By opening the scroll valve while closing the wastegate during the high speed and high load conditions, a larger portion of exhaust flow may be directed to both the scrolls to expedite turbine spin-up and boost delivery while reducing exhaust manifold pressure, residuals and engine pumping losses compared to an open scroll valve. As a result, higher peak power can be achieved.

As engine operating conditions change, a position of the scroll valve may be adjusted. For example, as engine speed-load conditions change, based on the schedules shown at maps 200 and 300, the scroll valve may be moved from a fully closed to a fully open position (or vice versa). Further, a wastegate schedule may be coordinated with the scroll valve adjustments. Further still, EGR valve adjustments may be coordinated with the scroll valve adjustments to improve cooled EGR delivery. Example adjustments are described herein with reference to FIGS. 12-17.

Now turning to FIG. 4, plot 400 depicts the improvement in transient response obtained by moving the scroll valve to a closed position. Plot 400 depicts a change in engine torque output (as BMEP) along the y-axis, over time along the x-axis. At t1, a transient increase in torque demand may be requested, such as due to a tip-in event. In response to the tip-in, turbine operation may be initiated with the scroll valve open (as shown by dashed line 402) or with the scroll valve closed (as shown by solid line 404). Between t1 and t2, while the turbine spins up, there may be no substantial difference between turbocharger output with the scroll valve open or closed, as this response is dictated by manifold filling. However, after t2, the lower engine backpressure experienced when operating with the scroll valve open reduces the transient response of the turbocharger. In comparison, when operating with the scroll valve closed, higher torque is achieved, as well as faster attainment of the higher torque. Further, the closed scroll valve allows for increased flexibility for trade-offs that may be required during the transient response, such as tumble, EGR, etc. If so equipped, an engine with variable charge motion (tumble) may be used to optimize burn rates for each condition.

Figure 5:
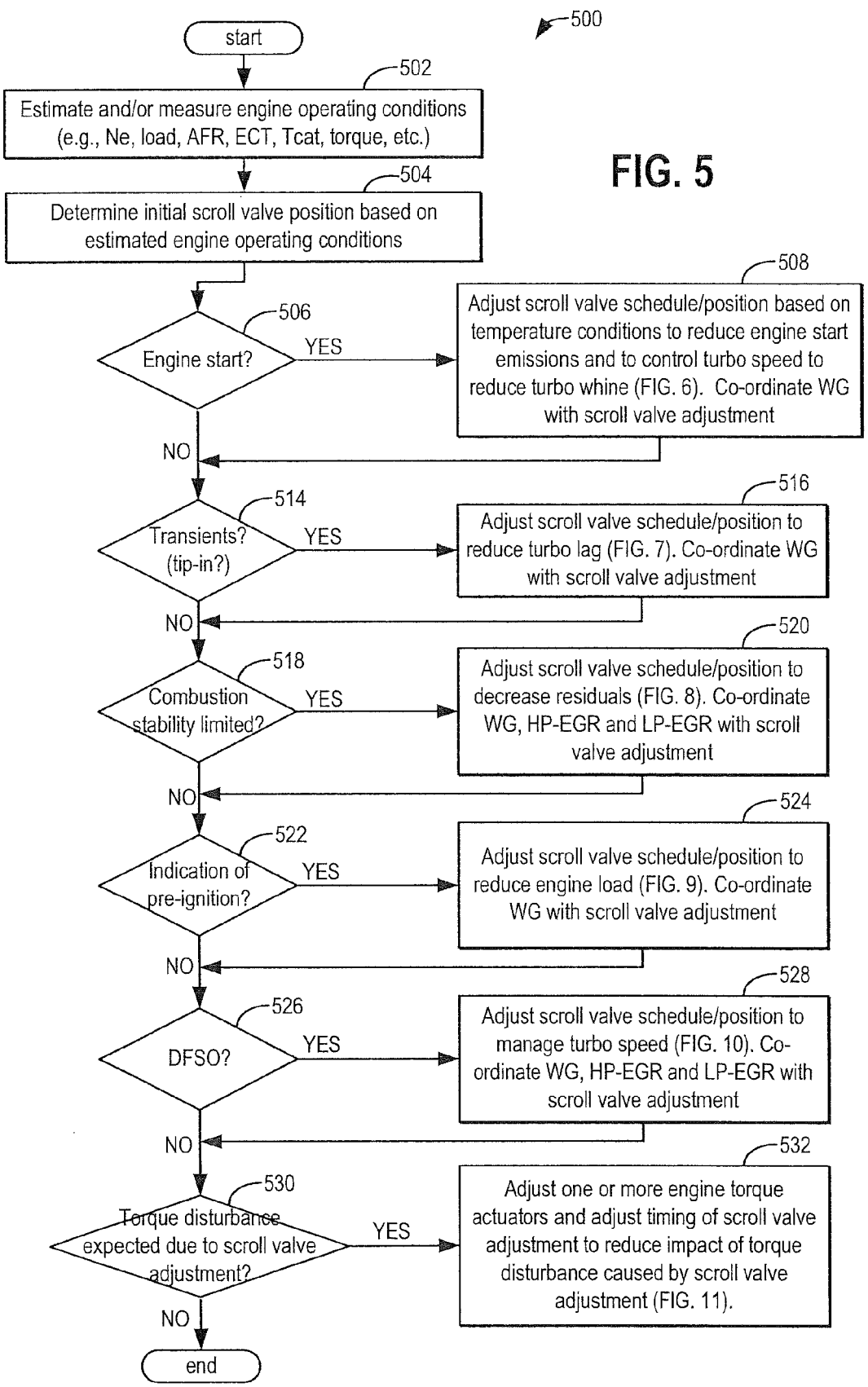
FIGS. 5-11 depict example flowcharts for adjusting the position of a scroll valve based on various engine operating conditions.

FIG. 5 depicts an example routine 500 that may be performed to adjust the position of a scroll valve coupled to an outer scroll of a multi-scroll exhaust turbine based on engine operating conditions. Specifically, the routine may determine an initial scroll valve position and schedule, and then based on engine operating conditions, including based on engine limitations, transients, EGR valve limits, etc., the initial scroll valve position and schedule may be further modified via the specific routines and sub-routines of FIGS. 6-11. The routine may further enable wastegate adjustments and EGR valve adjustments (including HP-EGR and LP-EGR adjustments) to be coordinated with the scroll valve adjustments to improve engine performance, torque output, and fuel economy.

At 502, the routine includes estimating and/or measuring engine operating conditions. These may include, for example, engine speed, torque demand, catalyst temperature, engine temperature, exhaust air-fuel ratio, MAP, MAF, barometric pressure, etc. At 504, based on the estimated engine operating conditions, an initial scroll valve position and schedule may be determined. As used herein, the scroll valve schedule may include determining how and when to transition the scroll valve to the initial position.

At 506, it may be determined if engine start conditions are present. For example, it may be determined if the engine is being started from an engine shutdown condition and/or while an exhaust catalyst is below a light-off temperature. If yes, then at 508, the routine includes further adjusting the scroll valve schedule and position (from the initial position determined at 504) based on the temperature conditions to reduce cold-start emissions, expedite catalyst heating, as well as to reduce the occurrence of any turbocharger whine. As elaborated with reference to FIG. 6, this may include starting the engine with the scroll valve open during some start conditions and starting the engine with the scroll valve closed during other start conditions. In particular, the scroll valve is adjusted to keep the turbocharger speed outside a resonance zone where turbo whine can occur. Wastegate adjustments may be coordinated with, and based on, the corresponding scroll valve adjustments. Example scroll valve adjustments performed during engine start conditions are described with reference to FIG. 14.

After an engine start has been completed (hot start or cold start), the routine proceeds to 514, where it may be determined if there are any transients. For example, it may be determined if there is a sudden increase in torque demand (e.g., due to an operator pedal tip-in). If yes, then at 516, the routine includes further adjusting a scroll valve schedule and position based on the transient conditions to meet the transient torque demand and reduce turbo lag. As elaborated with reference to FIG. 7, this may include moving the scroll valve to a more closed position in response to an increased torque demand. Wastegate adjustments may be coordinated with, and based on, the corresponding scroll valve adjustments. Example scroll valve adjustments performed during transient changes in torque demand are described with reference to FIG. 17.

At 518 (from 514 or 516), it may be determined if the engine is combustion stability limited. If yes, then at 520, the routine includes further adjusting a scroll valve schedule and position based on engine dilution and the combustion stability limits to decrease the amount of residuals in the combustion chamber. As elaborated with reference to FIG. 8, this may include moving the scroll valve to a position that enables less engine dilution to be provided. Wastegate adjustments as well as EGR valve adjustments (to the HP-EGR valve and/or the LP-EGR valve) may be coordinated with, and based on, the corresponding scroll valve adjustments. Example scroll valve adjustments performed during engine operation where combustion stability is limited are described with reference to FIG. 15.

At 522 (from 518 or 520), it may be determined if an engine hardware limit has been reached. For example, it may be determined if there is any indication of pre-ignition. If yes, then at 524, the routine includes further adjusting the scroll valve schedule and position based on the engine hardware limits to reduce an engine load. As elaborated with reference to FIG. 9, this may include moving the scroll valve to a more open position to rapidly reduce an engine load below engine hardware limits. Wastegate adjustments may be coordinated with, and based on, the corresponding scroll valve adjustments. Furthermore, other pre-ignition mitigating steps, such as fuel enrichment, may be used concurrently with the scroll valve adjustment to further expedite mitigation of the pre-ignition. Example scroll valve adjustments performed in response to an indication of pre-ignition are described with reference to FIG. 13.

At 526 (from 522 or 524), it may be determined if engine deactivation conditions have been met. For example, it may be determined if a deceleration fuel shut-off (DFSO) event is being performed. If yes, then at 528, the routine includes further adjusting the scroll valve schedule and position based on the engine deceleration indication to reduce turbine speed as per a desired deceleration speed profile and any potential torque disturbance. As elaborated with reference to FIG. 10, this may include adjusting the scroll valve to a more closed position based on turbine speed. Wastegate adjustments, as well as EGR valve adjustments, may be coordinated with, and based on, the corresponding scroll valve adjustments. Example scroll valve adjustments performed during engine deactivation are described with reference to FIG. 16.

At 530 (from 526 or 528), it may be determined if a torque disturbance (e.g., torque surge or dip) is expected due to the scheduled scroll valve adjustments (such as due to any of the scheduled scroll valve adjustments at 508-528). If yes, then at 532, the routine includes adjusting one or more engine torque actuators, as well as further adjusting a timing of the scroll valve transition (e.g., when the scroll valve is transitioning to or from an open or a closed position) to reduce the impact of the imminent torque surge/dip. By adjusting the valve schedule, the torque disturbance may be better masked, improving the vehicle operator's drive feel. Further, a timing of the scroll valve transition may be adjusted to overlap a transmission event. Example torque actuator adjustments and scroll valve timing adjustments performed to mask torque disturbances are described with reference to FIG. 12.

In this way, by using scroll valve adjustments, alone or in combination with wastegate and EGR valve adjustments, a range of engine operation over which boost benefits can be provided is enhanced. Further, the engine's tolerance to trade-offs performed as operating conditions vary is increased. Overall, engine performance is enhanced while also improving fuel economy.

Figure 6:
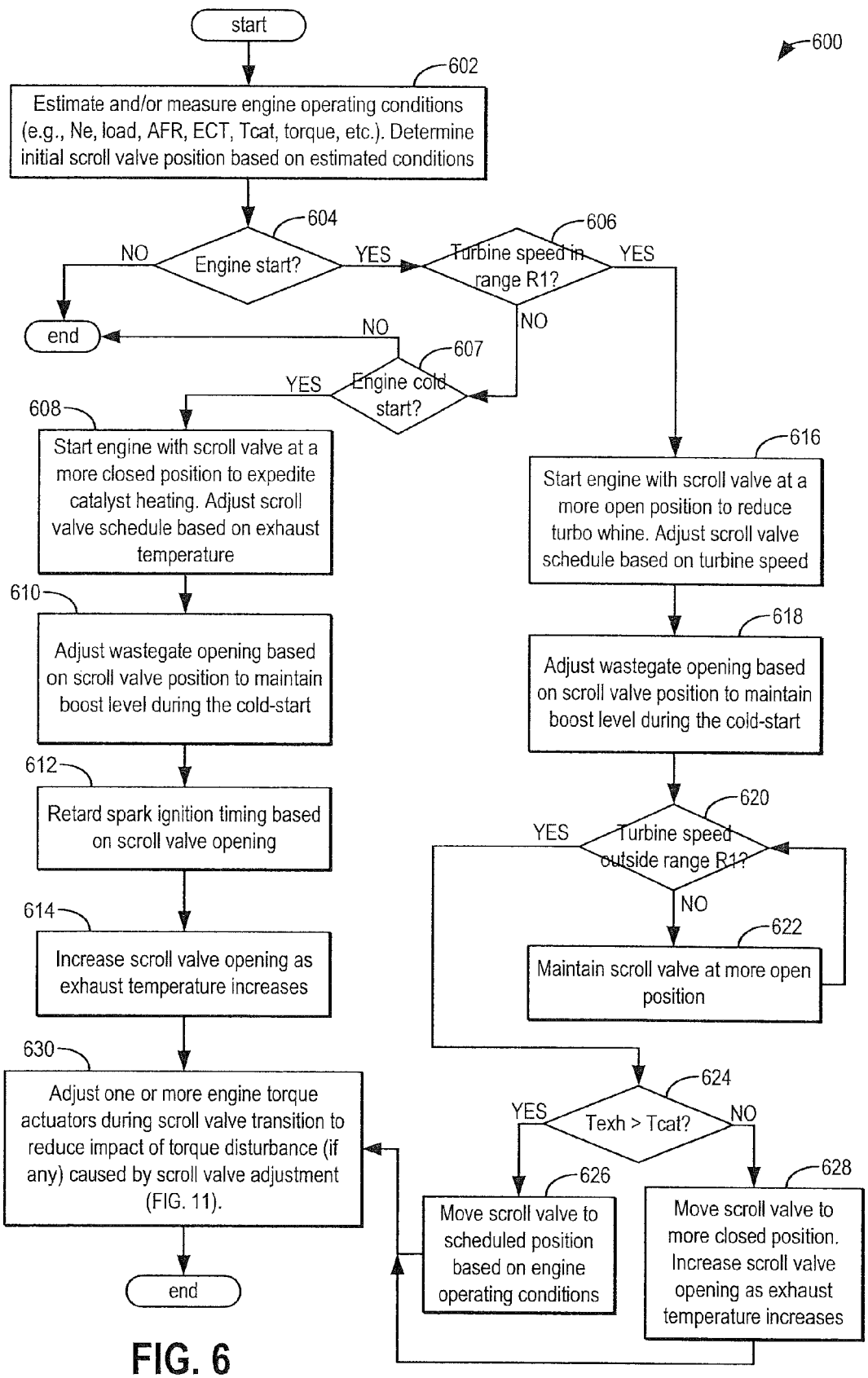

Now turning to FIG. 6, an example routine 600 that may be performed during start conditions is described. The routine enables cold-start emissions to be reduced, exhaust catalyst light-off to be expedited and turbocharger speed related NVH issues to be avoided.

At 602, the routine includes estimating and/or measuring engine operating conditions such as engine coolant temperature, exhaust catalyst temperature, torque demand, BP, MAP, MAF, etc. In addition, an initial scroll valve position may be determined based on the estimated operating conditions. At 604, the routine includes confirming an engine start condition. For example an engine start may be confirmed by engine speed being below a threshold. If engine start conditions are not confirmed, the routine may end. The engine start may include an engine hot start or an engine cold start. As such, turbocharger NVH concerns may not necessarily be temperature dependent and may need to be managed regardless of the exhaust catalyst temperature and light off state.

At specific turbocharger rotational speeds in turbocharged engine systems, NVH issues may occur. For example, a whine can be heard. The NVH issues may be particularly objectionable during engine starts when the overall engine system noise is not sufficient to mask any audible resonance at the turbocharger. Thus, at 606, it may be determined if selected engine start conditions are present, for example, start conditions that can lead to objectionable audible resonance at the turbocharger. Specifically, at 606, a turbine speed may be estimated and it may be determined if the turbine speed is within a range R1. In one example, the turbine speed range R1 may be based on turbine resonance and may correspond to a turbine speed range where turbocharger whine during a start is likely. The threshold range may be based on one or more manifold pressure, airflow, engine speed, estimated or measured exhaust gas temperature, and spark timing. In alternate embodiments, the selected start conditions may be further identified based on engine speed, intake manifold pressure, etc.

If the turbine speed is not inside range R1, the routine proceeds to 607, which includes confirming engine cold-start conditions. For example, an engine cold-start condition may be confirmed when an exhaust catalyst temperature is less than a threshold temperature (e.g., a catalyst light-off temperature). As another example, an engine cold-start condition may be confirmed when an exhaust temperature is less than a threshold temperature. As still another example, an engine cold-start condition may be confirmed when the engine has been shut-down for more than a threshold duration. Further considerations in assessing an engine cold-start condition may include ambient conditions (such as ambient temperature conditions), and engine temperature conditions (e.g., based on engine coolant temperature). If engine cold-start conditions are not confirmed, the routine may end.

If cold-start conditions are confirmed, the routine proceeds to 608 wherein the engine is started with a scroll valve coupled to an inlet of one scroll of a multi-scroll exhaust turbine adjusted to expedite catalyst warm-up. Herein, the one scroll may be a first, outer scroll, the turbine further including a second, inner scroll, the scroll valve not coupled to an inlet of the second scroll. The adjusting includes, in one example, moving the scroll valve to a more closed position. In one example, moving the scroll valve to a more closed position includes moving the scroll valve to a fully closed position. By closing the scroll valve, the turbine surface area for maximum heat flux to an exhaust catalyst is minimized, expediting catalyst warm-up. In addition, the time required to build boost on a subsequent tip-in is reduced.

The adjusting of the scroll valve may be based on exhaust temperature. For example, when the exhaust temperature at the cold-start is below a threshold, the valve may be moved to a more closed position (e.g., to a fully closed position), the valve then moved to a more open position (e.g., towards the fully open position) as the exhaust temperature moves above the threshold. In the depicted example, the threshold may be an exhaust catalyst light-off temperature. The scroll valve may then be maintained in the more closed position for a threshold number of combustion events since the engine cold-start. Then, after the threshold number of combustion events has elapsed, the scroll valve may be moved to a more open position.

Next, at 610, the routine includes adjusting a turbine wastegate position based on the scroll valve position to expedite catalyst heating. The adjusting includes, as an example, moving the wastegate to a more closed position as the scroll valve is moved to a more closed position, to pre-position the wastegate to improve boost response on possible subsequent tip-ins. In some embodiments, the wastegate position may be further adjusted based on the exhaust temperature at the cold-start. For example, the wastegate may be moved to a more open position as the exhaust temperature moves above the threshold. The routine may further include adjusting various engine operating parameters responsive to the scroll valve (and wastegate) adjustment to reduce torque transients during the scroll valve adjustments. For example, one or more of spark ignition timing, VCT, EGR and intake throttle position may be adjusted while moving the scroll valve based on the scroll valve position.

One or more additional steps may be taken to further expedite exhaust catalyst heating during the cold-start. For example, at 612, the routine includes retarding spark ignition timing based on the scroll valve opening. Herein, an amount of spark retard applied may be based on a difference between the exhaust temperature and a light-off temperature. However, by using the scroll valve adjustment, the amount of spark retard required may be less than the amount required when no scroll valve adjustment is used. Thus, by reducing the amount of spark retard required, fuel economy is improved.

At 614, the routine includes adjusting the scroll valve opening based on the exhaust temperature. Specifically, as the exhaust temperature increases (e.g., above a threshold temperature, such as a light-off temperature), the scroll valve opening may be increased. That is, as the catalyst warms up, the scroll valve is gradually moved from the fully closed to the fully open position, allowing more exhaust gas to flow through both scrolls of the turbine.

Figure 11:
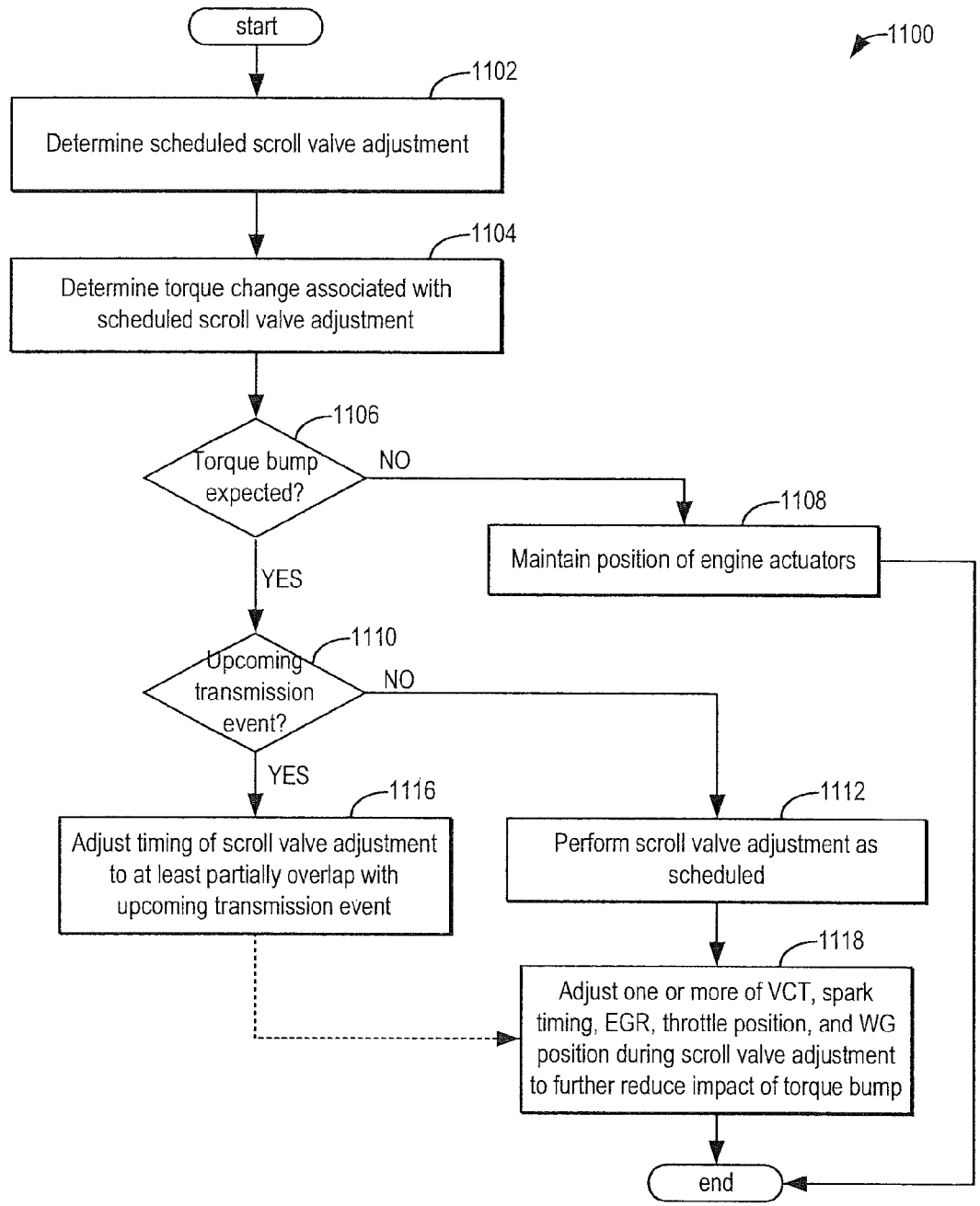

Next, at 630, and as further elaborated with reference to FIG. 11, the routine includes adjusting one or more engine torque actuators, as well as a timing of the scroll valve transition, to reduce the impact of any torque surge/dip caused by the scroll valve adjustment. By adjusting the engine torque actuators, any torque disturbance may be better masked, and the vehicle operator's drive feel may be improved. In one example, the adjusting includes adjusting a timing of the scroll valve based on a transmission event to better mask the torque surge.

Returning to 606, if the turbine speed is in range R1, then the routine proceeds to 616 wherein in response to selected engine start conditions being met (wherein the turbine speed is within a threshold range), the engine is started with the scroll valve coupled to the outer scroll of the exhaust turbine open. For example, when a cold-start condition includes an exhaust catalyst temperature being less than a threshold temperature and a turbine speed being below a threshold speed, the scroll valve is adjusted by moving the scroll valve to a more closed position. In comparison, when the cold-start condition includes the exhaust catalyst temperature being less than the threshold temperature and the turbine speed being above the threshold speed, the scroll valve is adjusted by moving the scroll valve to a more open position. As such, an opening of the scroll valve may be adjusted based on each of the turbine speed and an exhaust temperature.

While a nominal scroll valve position that is closed is advantageous for expediting catalyst light-off and reducing time to build boost, during some conditions, the closed position of the scroll valve can result in a turbocharger speed that elicits the audible resonance that is objectionable to the driver and/or passengers of the vehicle. In such instances, by commanding the scroll valve to the open position, the turbocharger speed is reduced, thereby moving the turbocharger out of the resonance conditions, and mitigating the objectionable noise. As such, the conditions at which the scroll valve may be opened may depend on, in addition to catalyst temperature and turbine speed, factors such as engine speed, air flow, intake manifold pressure, engine coolant or cylinder head temperature, air-fuel ratio, spark retard, torque reserve, exhaust manifold temperature and pressure and other similar parameters that are indicative of a cold start and which define the energy delivered by the turbine.

At 618, the routine includes adjusting an opening of a wastegate coupled across the exhaust turbine. Specifically, the controller may increase an opening of the wastegate while an opening of the scroll valve is increased to further reduce turbocharger speed and improve NVH. An order of opening of the wastegate and the scroll valve may be based on, for example, a relative authority of each of the wastegate and the scroll valve at the given operating conditions. For example, when turbine energy changes sufficiently, one or the other may be opened initially, while the other is closed. By coordinating the action of the scroll valve with the action of the wastegate, both the wastegate and the scroll can be used to mitigate the NVH issues that arise as turbine energy changes. Further, while the depicted example suggests opening the scroll valve and closing the wastegate, in alternate examples, the wastegate may be opened while the scroll valve is closed. One or the other may be closed to preposition the wastegate to improve boost response on possible subsequent tip-ins and/or manage turbo speed for NVH and/or maximize heat flux to the exhaust catalyst.

At 620, it may be determined if the turbine speed is outside range R1. If not, then at 622, the controller may maintain each of the scroll valve and wastegate open until the turbine speed is outside of the threshold range. Else, after the turbine speed is outside of the threshold range, the controller may adjust a position of each of the scroll valve and the wastegate based on exhaust temperature. Specifically, upon confirming that the turbine speed is outside range R1, at 624, the routine determines if the exhaust temperature is above the catalyst light-off temperature. If yes, then the routine moves to 626 wherein the scroll valve is moved to a scheduled position that is based on engine operating conditions. If not, the routine moves to 628, wherein the scroll valve is moved to a more closed position to expedite catalyst heating, the scroll valve opening then increased as the exhaust temperature increases and the exhaust catalyst becomes sufficiently warmed. In other words, the controller maintains each of the scroll valve and wastegate open until the turbine speed is outside of the threshold range. Then, after the turbine speed is outside of the threshold range, a position of each of the scroll valve and the wastegate is adjusted based on exhaust temperature.

From both 626 and 628, the routine proceeds to 630 wherein, as elaborated with reference to FIG. 11, the routine includes adjusting one or more engine torque actuators to better mask any torque disturbances caused by the scroll valve adjustment. Specifically, one or more of EGR, VCT, spark timing, and intake throttle position is adjusted during the engine cold-start based at least on the scroll valve adjustment.

It will be appreciated that while the depicted routine is ended in response to start conditions not being confirmed, in alternate embodiments, if no scroll valve adjustment is confirmed, an engine hot-start condition may be further confirmed. For example, based on whether the engine is already sufficiently heated (where one or more of engine temperature, exhaust temperature, and exhaust catalyst temperature are sufficiently high) or based on the engine being shut-down for less than a threshold duration, a hot start condition may be confirmed. During engine hot-start conditions, the scroll valve may be adjusted to expedite turbine spin-up and/or manage turbo speed for NVH. For example, the engine may be started with the scroll valve moved to a more open position.

It will also be appreciated that while the example of routine 600 discusses scroll valve adjustments used to manage turbo whine at low speed conditions of engine starts, similar turbo whine may be experienced at other low engine speed conditions not associated with a start. During such low speed conditions not associated with a start, the scroll valve may be similarly adjusted to a position that removes the turbine from a speed range that produces whine. The scroll valve position that avoids such a turbine speed may change based on the engine operating conditions, especially based on air-flow rate, exhaust gas pressure, and wastegate position.

In one example, during a first engine start conditions (e.g., a first engine cold-start condition), the engine may be started with the scroll valve open for a first, larger number of combustion events, while during a second engine start condition (e.g., a second, different engine cold start condition or an engine hot-start condition), the engine is started with the scroll valve more open for a second, smaller number of combustion events. The first engine start condition may include an exhaust catalyst temperature being lower than a threshold temperature, while the second engine start condition may include the exhaust catalyst temperature being higher than the threshold temperature. During the first engine start condition, an opening of the scroll valve may be adjusted based on the exhaust catalyst temperature while during the second engine start condition, the opening of the scroll valve may be adjusted based on the catalyst temperature, as well as turbocharger speed. The adjusting of the scroll valve during the first engine start may include, as an example, for a first number of combustion events, starting the engine with the scroll valve moved to a more closed position (e.g., fully closed) and as the exhaust catalyst temperature increases, increasing an opening of the scroll valve. Then, after the first number of combustion events, moving the scroll valve to a fully open position. In comparison, adjusting of the scroll valve during the second engine start may include, as an example, for a second number of combustion events, starting the engine with the scroll valve moved to a more open position (e.g., partially closed or fully open) and as the exhaust catalyst temperature increases, increasing an opening of the scroll valve. Then, after the second number of combustion events, moving the scroll valve to a fully open position. In one example, each of the first number and second number of combustion events may be based on an exhaust temperature at engine start. Alternatively, the number of combustion events may be based on engine coolant temperature upon start-up.

Further, during the first engine start condition, the engine may be started with a wastegate coupled to the exhaust turbine more open for the first, number of combustion events while during the second engine start condition, the engine is started with the wastegate more open for a second number of combustion events. Herein, during each of the first and second engine start conditions (e.g., cold-start and hot-start conditions), the opening of the wastegate may be based on the opening of the scroll valve.

In one example, an engine system comprises an engine, and a turbocharger for providing a boosted aircharge to the engine, wherein the turbocharger includes an intake compressor and an exhaust turbine. The exhaust turbine may include a first outer and a second inner scroll, and a scroll valve may be coupled between an engine exhaust manifold and an inlet of the first outer scroll. The engine system may further include a wastegate in a bypass coupled between an inlet and an outlet of the turbine. A controller of the engine system may be configured with computer readable instructions for, during an engine start (e.g., cold-start) condition, starting the engine with an opening of the scroll valve adjusted responsive to exhaust temperature for a number of cylinder events since a first combustion event. The adjusting may include, starting the engine with the scroll valve more closed, and increasing an opening of the scroll valve as the exhaust temperature rises. Alternatively, the controller may be configured with computer readable instructions for, during an engine start (e.g., hot start or cold-start) condition, where turbine speed is lower than a threshold speed, starting the engine with an opening of the scroll valve increased based on the turbine speed. Then, after the turbine speed is higher than the threshold, decreasing the opening of the scroll valve (e.g., based on exhaust temperature). The controller may include further instructions for adjusting the wastegate while adjusting the scroll valve during the cold-start, the wastegate adjustment based on the scroll valve adjustment to expedite exhaust catalyst heating during the cold-start.

In this way, adjustments to a scroll valve position may be used during engine start conditions to move turbine speed out a speed range that produces turbo whine. Scroll valve position adjustments may also be advantageously used during the engine start to expedite catalyst heating and reduce cold-start emissions. An example scroll valve adjustment is now described with reference to FIG. 14.

Figure 14:
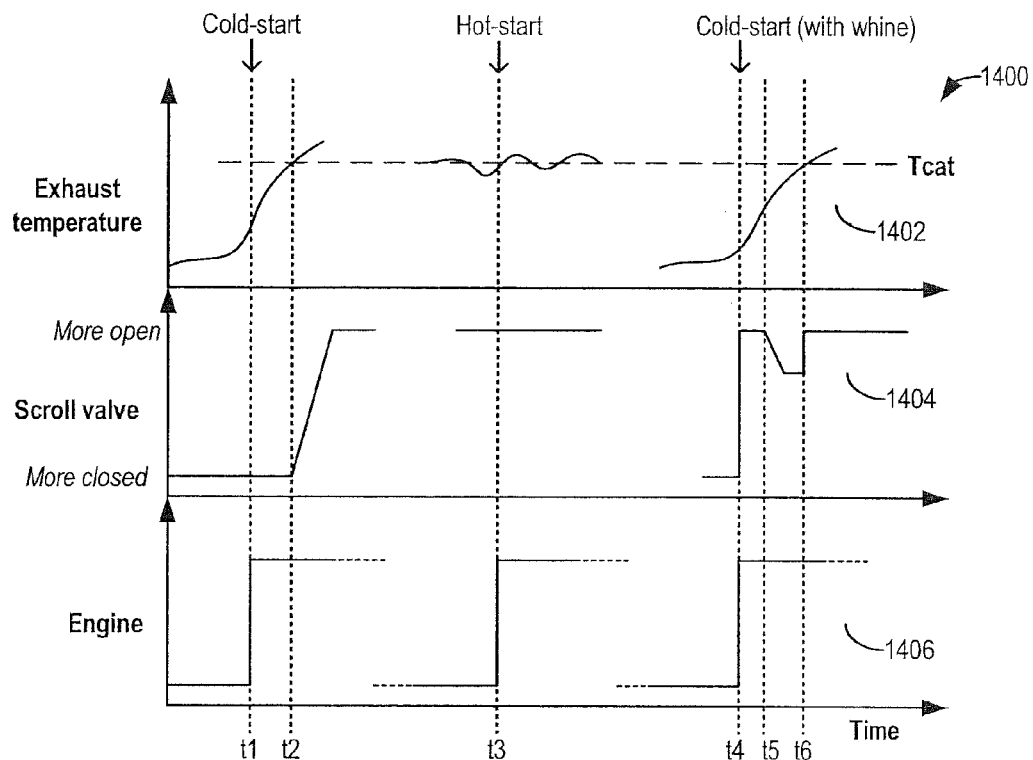

Map 1400 of FIG. 14 depicts adjusting of a scroll valve coupled to an inlet of an outer scroll of a multi-scroll exhaust turbine responsive to engine start conditions, specifically, responsive to an engine hot-start, or different engine cold-start conditions. Map 1400 depicts exhaust temperature at plot 1402, scroll valve adjustments at plot 1404, and engine conditions (on or off) at plot 1406. All plots are depicted over time, plotted along the x-axis.

Prior to t1, the engine may be shutdown. At t1, an engine restart request may be received. The engine restart at t1 may be an engine cold-start due to the engine being shut-down for a duration that is longer than a threshold. As such, over the duration of the engine shutdown, an exhaust catalyst may have cooled (plot 1402) to below a light-off temperature (Tcat). Thus, at t1, an engine cold-start may be initiated wherein the engine is spun up. In the depicted example, the cold-start condition at t1 may be a first cold-start condition, where the turbine speed is outside a threshold range where turbo whine can occur. As such, the threshold range may be based on one or more of manifold pressure, engine speed, and spark timing. Thus, the first cold-start condition may include no indication of turbocharger resonance. Accordingly, at t1, the engine may be started (plot 1405) with the scroll valve moved to a more closed position (plot 1404). In the depicted example, the scroll valve may be moved to a fully closed position. By closing the scroll valve, heat loss through the turbine is reduced, increasing the exhaust heat transferred to the exhaust catalyst. As such, this expedites exhaust warm-up.

The engine may be started with the scroll valve in the more closed position for a first, larger number of combustion events since the engine start. In the depicted example, the scroll valve is maintained closed for a duration between t1 and t2. Then, after the threshold number of combustion events have elapsed, at t2, the scroll valve opening may be adjusted based on the exhaust temperature. In the depicted example, at t2, the exhaust may also be at the light-off temperature. Thus, as the exhaust temperature increases above the threshold temperature after t2, the scroll valve opening may be gradually increased until it is fully open. In alternate examples, the scroll valve may be immediately moved to a fully open position. Then engine may then be operated with the scroll valve fully open. By opening the scroll valve, engine pumping losses are reduced.

After t2 and before t3, the engine may be shut-down temporarily. For example, the engine may be in an idle-stop condition, where the engine is selectively deactivated. The engine deactivation may be short enough that the exhaust catalyst is not sufficiently cooled and is at or above Tcat (plot 1402). At t3, an engine restart request is received. In response to the engine hot-start condition at t3, the engine may be restarted (plot 1406) with the scroll valve open (in the depicted example, fully open).

After t3 and before t4, the engine may be shut-down. At t4, an engine restart request may be received. The engine restart at t4 may also be an engine cold-start due to the engine being shut-down for a duration that is longer than a threshold. As such, over the duration of the engine shut-down, an exhaust catalyst may have cooled (plot 1402) to below a light-off temperature (Tcat). In addition, the scroll valve may be closed during the shut-down. Thus, at t4, an engine cold-start may be initiated wherein the engine is spun up. In the depicted example, the cold-start condition at t4 may be a second cold-start condition, where the turbine speed is inside a threshold range where turbo whine can occur. As such, the threshold range may be based on one or more of manifold pressure, engine speed, and spark timing. Thus, the second cold-start condition may include an indication of potential turbocharger resonance. Accordingly, at t4, the engine may be started (plot 1405) with the scroll valve moved to a more open position (plot 1404), such as a fully open position. By opening the scroll valve, exhaust manifold pressure is reduced, and turbine speed is reduced. This brings the turbine speed out of the range where whine can occur. In the depicted example, the scroll valve may be moved to a fully open position.

The engine may be started with the scroll valve in the more open position for a second, smaller number of combustion events since the engine start (as compared to the first number of combustion events at the first cold start at t1). In the depicted example, the scroll valve is maintained open for a duration between t4 and t5. Then, after the threshold number of combustion events have elapsed, at t5, the scroll valve opening may be adjusted based on the exhaust temperature. In the depicted example, at t5, the exhaust may still be below the light-off temperature. Thus, after t5, the scroll valve is gradually closed to expedite catalyst warm-up until the scroll valve is fully closed before t6. At t6, the exhaust temperature increases above the threshold temperature responsive to which the scroll valve opening is increased to a fully open position. Then engine may then be operated with the scroll valve fully open.

While not depicted in the example of FIG. 14, in further examples, a controller may adjust a wastegate coupled across the exhaust turbine responsive to the cold-start or hot start condition. The controller may also adjust various engine torque actuators, such as one or more of spark ignition timing, VCT, and intake throttle position based on the scroll valve adjustment. In this way, by adjusting a scroll valve adjustment during an engine cold-start, catalyst warm-up is expedited, cold-start exhaust emissions and turbo whine are reduced.

Figure 7:
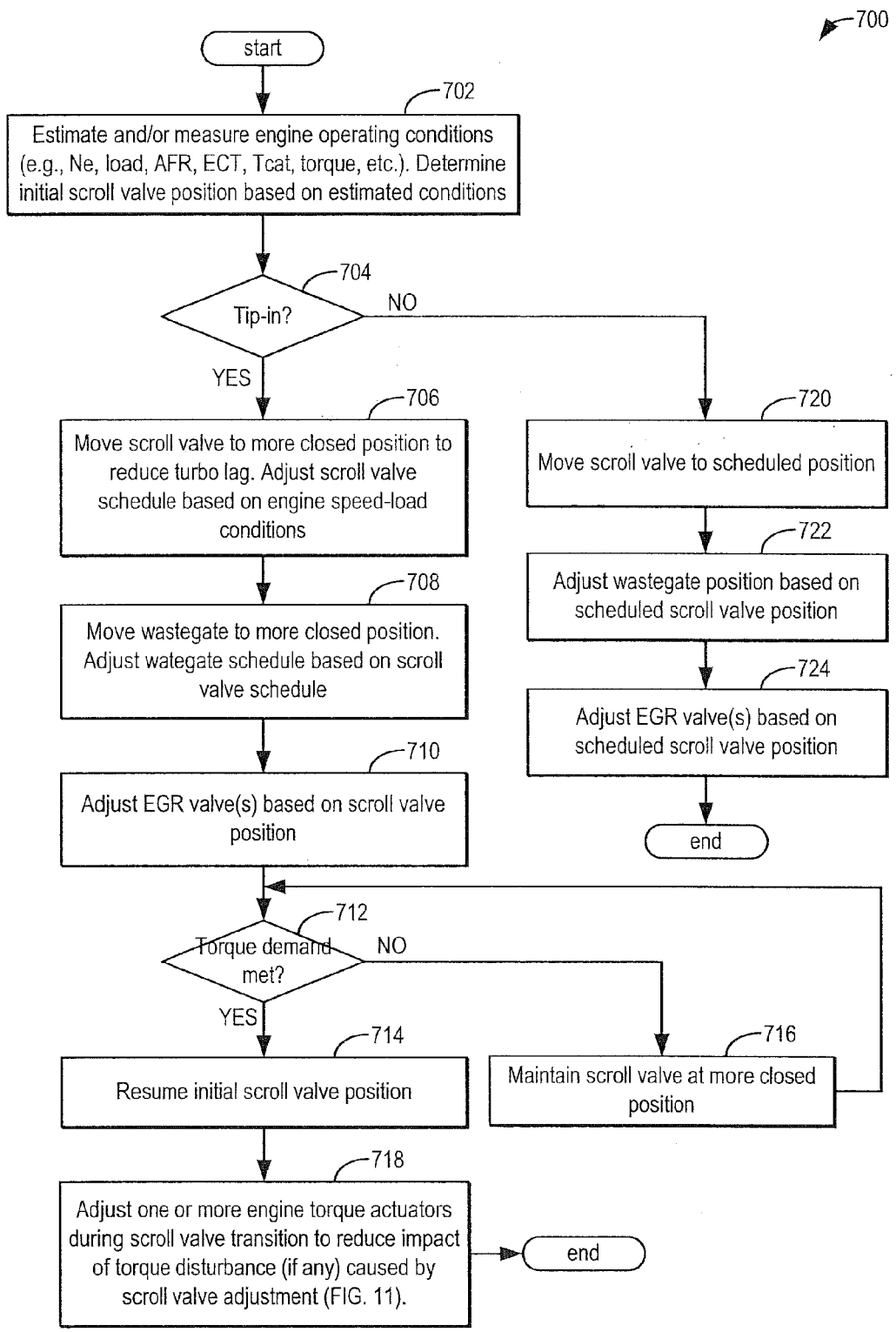

Now turning to FIG. 7, an example routine 700 is shown for adjusting a scroll valve coupled to an inlet of an outer scroll of a multi-scroll exhaust turbine responsive to an increased torque demand, such as following a tip-in. The approach allows turbo lag to be reduced.

At 702, the routine includes estimating and/or measuring engine operating conditions such as engine coolant temperature, exhaust catalyst temperature, torque demand, BP, MAP, MAF, etc. In addition, an initial scroll valve position may be determined based on the estimated operating conditions.

At 704, a tip-in may be confirmed. For example, it may be determined if the torque demand has increased by more than a threshold amount, and/or whether an accelerator pedal has been depressed by more than a threshold amount. If tip-in conditions are not confirmed, at 720, the routine includes moving the scroll valve to the initial position, as determined and scheduled at 702. Further, at 722, a position of a wastegate coupled across the exhaust turbine may be adjusted based on the scheduled scroll valve position so that the engine torque demand estimated at 702 can be provided. Further still, at 724, residuals may be recirculated from the engine exhaust to the engine intake via the EGR system(s), with the valves adjusted to settings determined at 702, to meet the torque demand. This includes adjusting an LP-EGR valve if the engine system includes an LP-EGR system and an HP-EGR valve if the engine system includes an HP-EGR system to provide the determined amount of exhaust gas recirculation.

If a tip-in is confirmed, then at 706, the routine includes, in response to the tip-in, adjusting an opening of a scroll valve coupled to the outer scroll of a multi-scroll exhaust turbine to reduce turbo lag. Specifically, the adjusting includes reducing the opening of the scroll valve. That is, the scroll valve may be moved to a more closed position. In one example, the scroll valve may be moved to a fully closed position. The scroll valve closing may be based on the torque demanded at the tip-in. For example, the scroll valve closing may be based on a difference between the torque demanded and the torque that can be provided at the engine operating conditions existing at the tip-in. As the difference increases, the scroll valve may be moved closer to a fully closed position to improve turbine spin-up. In an alternate example, the reducing the opening of the scroll valve may be based on an estimated or measured turbine speed at the tip-in. Therein, as a difference between the estimated or measured turbine speed and a requested turbine speed (based on the torque demanded) increases, the scroll valve towards may be moved towards the fully closed position. In still a further example, the reducing the opening of the scroll valve may be based on an estimated or measured boost pressure at the tip-in. Therein, as a difference between the estimated or measured boost pressure and a requested boost pressure (based on the torque demanded) increases, the scroll valve towards may be moved towards the fully closed position. By closing the scroll valve responsive to the tip-in, exhaust manifold pressure may be increased, thereby expediting turbine spin-up. As such, this reduces turbo lag and allows the increased torque demand to be quickly met. In some examples, the scroll valve opening may also be adjusted based on ambient air density, such as during the tip-in, the valve moved towards a fully closed position as the ambient air density decreases.

At 708, the routine includes, adjusting an opening of a wastegate coupled across the exhaust turbine in response to the tip-in, the wastegate opening based on the scroll valve opening. By closing the wastegate, exhaust manifold pressure can be further increased. For example, the wastegate may be moved towards a fully closed position as the scroll valve is moved towards the fully closed position. A timing of the wastegate adjustment may be based on a timing of the scroll valve adjustment and further based on an authority of the wastegate relative to the authority of the scroll valve. For example, when the wastegate has lower authority relative to the scroll valve, the wastegate adjustment may follow the scroll valve adjustment. That is, first the wastegate may be kept open while the scroll valve is moved to the closed position, and then the scroll valve may be opened while the wastegate is closed. In another example, when the wastegate has higher authority relative to the scroll valve, the wastegate adjustment may lead or be concurrent with the scroll valve adjustment. That is, first the scroll valve may be kept open while the wastegate is moved to the closed position, and then the wastegate may be opened while the scroll valve is closed. Alternatively, they may be concurrently closed.

At 710, the routine includes adjusting an amount of exhaust gas recirculated to the engine intake. Specifically, an amount of EGR may be reduced as the scroll valve moves towards the fully closed position. In some embodiments, the engine may include an EGR system having an LP-EGR valve in an LP-EGR passage for recirculating exhaust gas from the exhaust manifold, downstream of the turbine, to the intake manifold, upstream of the compressor, as well as an HP-EGR valve in an HP-EGR passage for recirculating exhaust gas from the exhaust manifold, from upstream of the turbine, to the intake manifold, downstream of the compressor. The engine controller may adjust each of the LP-EGR valve and the HP-EGR valve in response to the tip-in to vary a ratio of HP-EGR to LP-EGR based on the scroll valve closing. As one example, the controller may increase an opening of the LP-EGR valve while decreasing an opening of the HP-EGR valve to increase a ratio of LP-EGR to HP-EGR. In another example, the controller may decrease the opening of each of the LP-EGR valve and the HP-EGR valve to reduce engine dilution.

At 712, it may be confirmed if the elevated torque demand (responsive to the tip-in) has been met. In one example, it may be determined that the torque demand has been met if the turbine has sufficiently spun up. Thus, at 712, it may be determined if the turbine speed is above the threshold. If not, then at 716, the controller may maintain the scroll valve closed until the turbine speed is at or above the threshold speed (or boost pressure is at or above a requested boost pressure). Alternatively, the controller may continue reducing the opening of the scroll valve (towards the fully closed position), or maintain the scroll valve at a closed position, until the turbine speed is at or above the threshold speed (or boost pressure is at or above the requested boost pressure).

At 714, after the turbine speed, or in another example boost pressure, is at or above a threshold, the routine includes opening the scroll valve. For example, the scroll valve may be fully opened.

At 718, as further elaborated with reference to FIG. 11, the routine includes adjusting one or more engine torque actuators, as well as a timing of the scroll valve transition, to reduce the impact of any torque surge/dip caused by the scroll valve adjustment. By adjusting the engine torque actuators, any torque disturbance may be better masked, and the vehicle operator's drive feel may be improved. In one example, the adjusting includes adjusting a timing of the scroll valve based on a transmission event following the tip-in to better mask the torque disturbance.

In this way, adjustments to a scroll valve during a tip-in may be advantageously used to expedite turbine spin-up and improve boost performance during the tip-in. An example scroll valve adjustment is now described with reference to FIG. 17.

Figure 17:
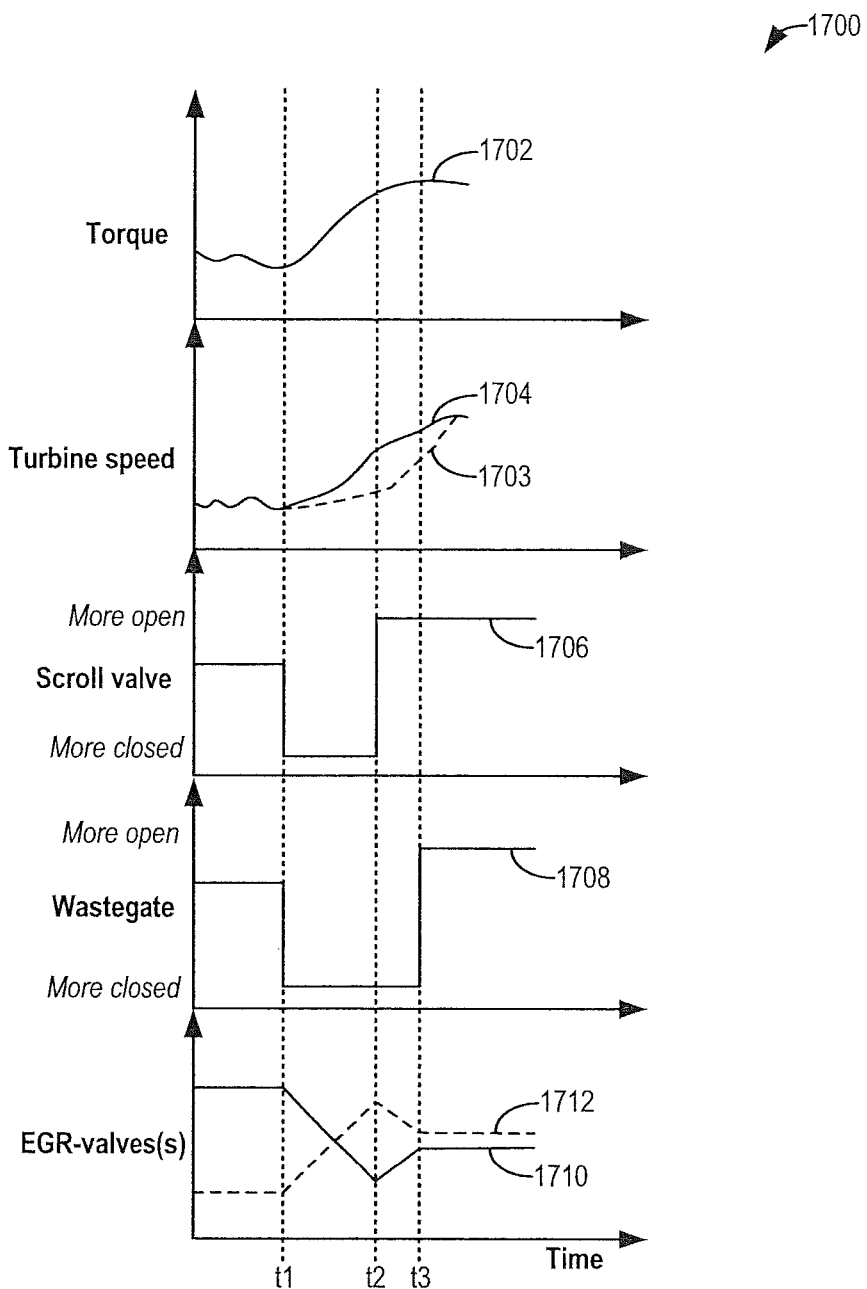

Map 1700 of FIG. 17 depicts adjusting of a scroll valve coupled to an inlet of an outer scroll of a multi-scroll exhaust turbine responsive to increased torque demand, specifically, responsive to a tip-in. Map 1700 depicts an engine torque at plot 1702, turbine speed at plot 1704, scroll valve adjustments at plot 1706, wastegate adjustments at plot 1708, HP-EGR valve adjustments at plot 1710, and LP-EGR valve adjustments at plot 1712. All plots are depicted over time, plotted along the x-axis.

Prior to t1, the engine may be operating with each of the scroll valve (plot 1706) and the wastegate (plot 1708) at least partially open to provide engine torque (plot 1702) control. At t1, a tip-in event may be confirmed. In response to the tip-in event, the scroll valve coupled to an outer scroll of a multi-scroll turbine is moved to a more closed position. In the depicted example, closing the scroll valve includes fully closing the scroll valve. As such, the scroll valve may be kept closed for a duration following the tip-in until the turbine speed (plot 1704) is at or above a threshold speed. In the depicted example, the scroll valve is maintained closed from t1 to t2. At t2, when the turbine speed is sufficiently high (e.g., above a threshold speed), the scroll valve is opened. In the depicted example, opening the scroll valve includes fully opening the scroll valve.

In one example, the duration of scroll valve closing may be based on turbine speed following the tip-in, with the duration increased as the turbine speed following the tip-in decreases. In other words, if a larger spin-up is required, the scroll valve may be moved to a more closed position, while if a smaller spin-up is required, the scroll valve may be moved to a relatively less closed position. By closing the scroll valve responsive to a tip-in, an exhaust manifold pressure can be rapidly increased, thereby enabling the turbine to quickly spin-up. As such, this reduces turbo lag and allows transients to be better addressed. In comparison, if the scroll valve was not closed following the tip-in, an amount of time taken to spin up the turbine may be longer, as shown by plot 1703 (dashed line), and as also shown at FIG. 4.

At t1, while closing the scroll valve, a net amount of EGR delivered to the engine may also be reduced. This may include reducing an opening of an LP-EGR valve coupled to an LP-EGR system, or reducing an opening of an HP-EGR valve coupled to an HP-EGR system. Further still, the controller may adjust the opening of each of the LP-EGR valve and the HP-EGR valve to vary a ratio of LP-EGR to HP-EGR delivered to the engine. In the depicted example, an opening of the HP-EGR valve (plot 1710) is decreased to reduce an amount of residuals recirculated from upstream of the turbine to downstream of the compressor. At the same time, an opening of the LP-EGR valve (plot 1712) is increased to increase an amount of residuals recirculated from downstream of the turbine to upstream of the compressor. As such, the net amount of EGR and engine dilution may be reduced. In alternate embodiments, the net amount of EGR may be maintained while the scroll valve is closed.

At t1, to further assist in turbine spin-up, the wastegate is kept closed responsive to the closing the scroll valve. Herein, the wastegate has higher, or comparable authority and therefore is adjusted concurrent to the scroll valve. However in alternate examples, such as when the wastegate has lower authority, the wastegate adjustment may follow the scroll valve adjustment. The wastegate may also be controlled to intermediate positions to actively control boost to a desired set point. In some examples, the timing of the scroll valve adjustment may be further based on a transmission event following the tip-in.

At t3, in response to sufficient turbine and engine spin-up, the wastegate may be opened after the scroll valve is opened. In addition, at t3, an opening of the LP-EGR valve may be reduced while an opening of the HP-EGR valve is increased, so as to increase the net amount of engine dilution. In an alternate example, a controller may open the scroll valve while maintaining the amount of EGR delivered to the engine. In yet another example, the opening of the HP-EGR valve may be reduced while an opening of the LP-EGR valve is increased, so as to increase the net amount of engine dilution.

While not depicted in the example of FIG. 17, in further examples, a controller may adjust various engine torque actuators, such as one or more of spark ignition timing, VCT, valve overlap, and an intake throttle position based on the scroll valve adjustment, the measured boost pressure and the torque transients. In this way, scroll valve adjustments may be performed responsive to transient torque demands. By closing the scroll valve when torque demand increases, turbine spin up can be expedited. By adjusting the engine dilution (via EGR valve adjustments) based on the scroll valve adjustment, torque transients and combustion stability concerns can be better addressed, improving engine performance.

Figure 8:
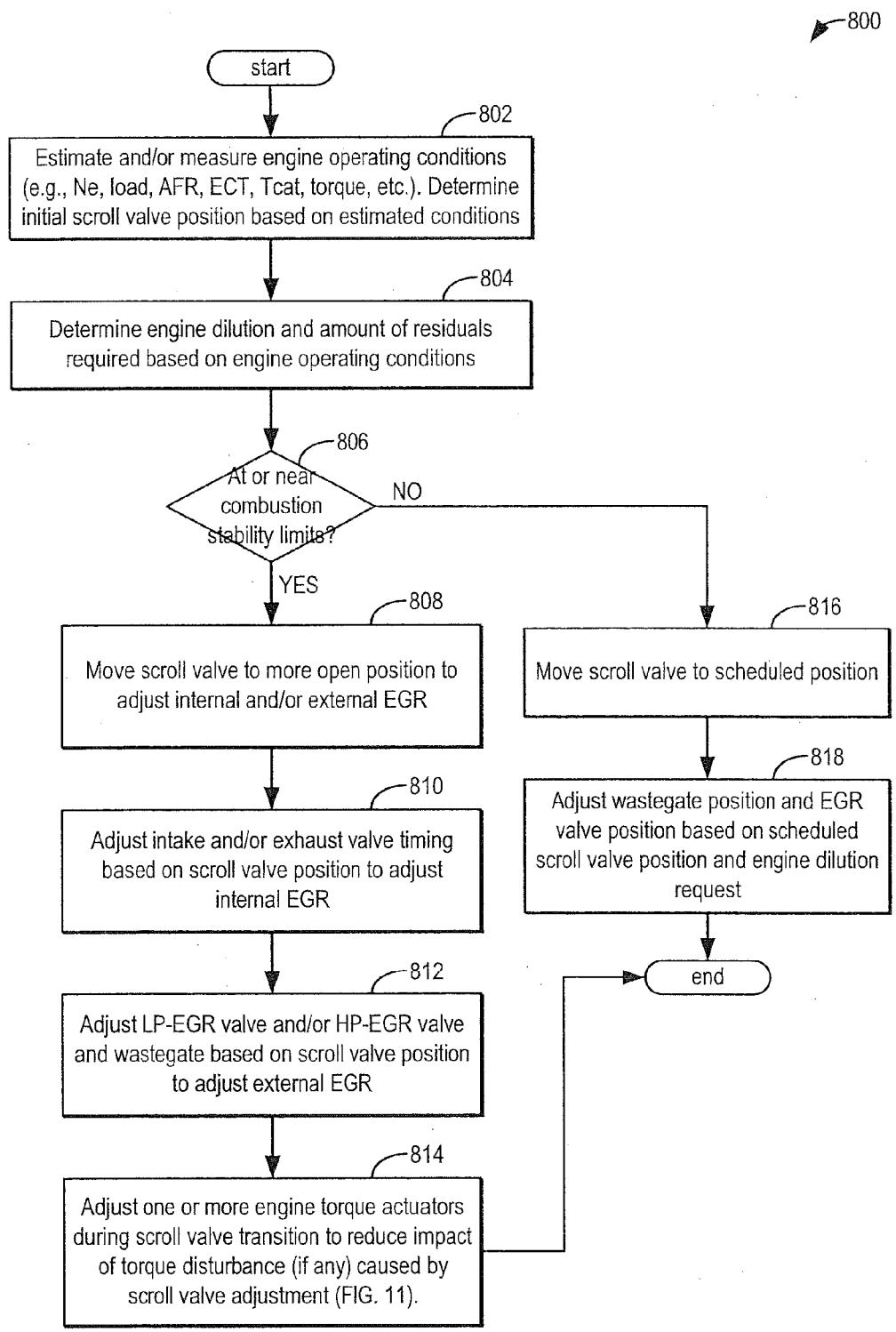

Now turning to FIG. 8, an example routine 800 is shown for adjusting a scroll valve coupled to an inlet of an outer scroll of a multi-scroll exhaust turbine responsive to engine dilution. The approach allows combustion stability limits for engine combustion to be improved.

At 802, the routine includes estimating and/or measuring engine operating conditions such as engine coolant temperature, exhaust catalyst temperature, torque demand, BP, MAP, MAF, etc. In addition, an initial scroll valve position may be determined based on the estimated operating conditions.

At 804, the routine includes determining an engine dilution required based on the estimated operating conditions. The engine dilution request may include a request for LP-EGR and/or a request for HP-EGR. Further, an amount of residuals to be recirculated from the engine exhaust manifold to the engine intake manifold, such as via an EGR system, may be determined based on the required dilution and the estimated operating conditions. As used herein, recirculating via an EGR system may include recirculating via a low-pressure EGR system coupled between the engine exhaust, downstream of the turbine, and the engine intake, upstream of an intake compressor, by opening a first EGR valve and/or recirculating via a high-pressure EGR system coupled between the engine exhaust, upstream of the turbine, and the engine intake, downstream of the intake compressor, by opening a second, different EGR valve. Further, residuals may be recirculated from the engine exhaust to the engine intake via the EGR system(s) to provide the desired dilution until a combustion stability limit is reached At 806, it may be determined if an engine combustion stability has been reached, or is being approached. Fuel economy and emissions can be improved at many engine operating conditions by increasing the amount of burned gas trapped in a cylinder (also referred to as residuals). This burned gas can be introduced during a valve overlap period (internal EGR), or by recirculating exhaust gas to the engine intake (external EGR). The recirculated exhaust gas can be taken from the exhaust path upstream (HP-EGR) or downstream (LP-EGR) of the turbine, and may or may not be cooled. However, there may be limits to the amount of residuals that can be tolerated due to combustion stability constraints. For example, residuals may need to be limited at high load conditions to allow the demanded torque to be delivered. In one example, it may be determined at 806 if the engine will operate at or near combustion stability limits when operating with the EGR valves and the scroll valve at the initially scheduled position. Herein, the combustion stability limits may have been previously determined based on the engine operating conditions and parameters.

If combustion stability limits have not been reached, then at 816, the routine includes moving the scroll valve to the initial position, as determined and scheduled at 802. Further, at 818, a position of a wastegate coupled across the exhaust turbine may be adjusted based on the scheduled scroll valve position and the engine dilution request so that the required engine dilution can be provided. Further still, residuals may be recirculated from the engine exhaust to the engine intake via the EGR system(s), with the valves adjusted to settings determined at 802, to provide the desired dilution until a combustion stability limit is reached.

If combustion stability limits have been reached, then at 808, the routine includes, adjusting the scroll valve position responsive to the engine dilution request relative to the engine combustion stability limits. This includes moving the scroll valve to a more closed position as a request for engine dilution increases, and moving the scroll valve towards a more open position as a request for engine dilution decreases (to reduce internal residuals). For example, the scroll valve schedule may be adjusted based on intake manifold pressure. Therein, as the manifold pressure increases (above a threshold pressure), the scroll valve may be moved towards the more open position.

The scroll valve adjustment may be further based on whether the dilution request was for LP-EGR or HP-EGR. For example, when the dilution request is for increased HP-EGR, the scroll valve may be moved to a more closed position to ensure that the exhaust manifold pressure is sufficiently high to flow EGR to the intake manifold (e.g., the exhaust manifold pressure is higher than the intake manifold pressure). In comparison, when the dilution request is for increased LP-EGR, the scroll valve may be moved to a more open position.

As such, the position of the scroll valve affects the amount of internal EGR delivered to the cylinders through its impact on the exhaust manifold pressure during the valve overlap period. Further, for engine systems configured with LP-EGR, the position of the scroll valve affects the maximum turbine energy. This, in turn, dictates the maximum amount of air and/or EGR that can be delivered to the engine system through the compressor. Further still, for engine systems configured with HP-EGR, the position of the scroll valve affects EGR delivery via its impact on the exhaust manifold pressure. It also changes the available turbine energy, thereby also dictating the maximum amount of air that can be delivered to the engine system through the compressor.

At 810, an intake and/or exhaust valve timing may be adjusted based on the scroll valve position to adjust an amount of internal EGR delivered to the engine. For example, where the valve timing is adjusted via a variable cam timing (VCT) device, VCT adjustments may be used to decrease an amount of intake to exhaust valve overlap to decrease an amount of residuals delivered via internal EGR. Valve timing adjustments may include retarding intake valve opening and/or advancing exhaust valve closing. By opening the intake valve later and/or closing the exhaust valve earlier, while the scroll valve is at the more closed position, internal EGR is reduced.

At 812, one or more of the LP-EGR valve and the HP-EGR valve may be adjusted based on the scroll valve position to adjust an amount of external EGR delivered to the engine. As one example, while moving the scroll valve to the more closed position, an opening of the first LP-EGR valve and/or the second HP-EGR valve may be reduced to reduce an amount of residuals delivered to the engine via external EGR. As another example, the controller may maintain the first LP-EGR valve and/or the second HP-EGR valve open while decreasing the opening of the scroll valve. It will be appreciated that while the above routine discusses making scroll valve adjustments to meet engine dilution needs when the engine reaches combustion stability limits, in still further embodiments, the scroll valve adjustments may be made to meet engine dilution needs when at least one of the LP-EGR valve and the HP-EGR valve reaches a limit. This may include, for example, an opening limit (beyond which the valve cannot be opened any further) or a closing limit (beyond which the valve cannot be closed any further) of the EGR valves. As such, when any of the EGR valves reach their opening or closing limit, further changes to residual amounts, as well as a further change in LP-EGR to HP-EGR ratio may be provided by corresponding adjustments to the scroll valve. Wastegate adjustments may be concomitantly used with, and based on the scroll valve adjustments, to meet the engine dilution requirement.

At 814, the routine includes adjusting one or more engine actuators during the scroll valve transition to reduce any impact of a torque disturbance resulting from the scroll valve adjustment. For example, the routine may include adjusting one or more of a wastegate coupled to the exhaust turbine, spark ignition timing, VCT, positive valve overlap, and intake throttle opening while moving the scroll valve to the more closed position wherein the adjusting is based on each of the scroll valve position and engine dilution. As elaborated with reference to FIG. 11, the actuator adjustment may be used to better mask any torque surge/dip that may arise during the scroll valve adjustment, thereby improving the vehicle operator's drive feel. In one example, a timing of the scroll valve adjustment is based on a transmission event to better mask the torque disturbance.

In this way, adjustments to the LP-EGR valve and HP-EGR valve can be coordinated with wastegate and scroll valve actions so as to manage residuals. Then, as turbine energy changes, one of the wastegate and the scroll valve can be opened to manage boost response while using the other to manage exhaust pressure for residual control. Alternatively, one of the wastegate and the scroll valve may be opened initially, while the other is maintained closed. Then, as the turbine energy changes sufficiently, the other which was closed may be opened, while the first one is closed. An order of opening and closing may depend on the relative authority of each device at the various operating conditions.

In one example, an engine system comprises an engine, and a turbocharger for providing a boosted aircharge to the engine, wherein the turbocharger includes an intake compressor and an exhaust turbine. The exhaust turbine may include a first outer and a second inner scroll with a scroll valve coupled to an inlet of the first outer scroll but not to an inlet of the second inner scroll. A wastegate may be included in a bypass coupled between an inlet and an outlet of the turbine. A first EGR passage may be coupled between an engine exhaust, downstream of the turbine, and an engine intake, upstream of the compressor, the first EGR passage including a first EGR valve. A second EGR passage may be coupled between the engine exhaust, upstream of the turbine, and the engine intake, downstream of the compressor, the second EGR passage including a second EGR valve. The engine system may further include a controller with computer readable instructions for, opening one or more of the first EGR valve and the second EGR valve to provide engine dilution, and upon reaching a limit, providing further engine dilution by decreasing an opening of the scroll valve. The limit may include one of an opening limit of the first EGR valve and/or an opening limit of the second EGR valve. The controller may be configured to maintain the first and/or second EGR valve open while increasing the opening of the scroll valve. Alternatively, the controller may be configured to decrease the opening of the first and/or second EGR valve while increasing the opening of the scroll valve. The controller may be further configured to adjust the opening of each of the first and second EGR valve while decreasing the opening of the scroll valve to vary a ratio of high-pressure EGR to low-pressure EGR delivered to the engine.

In another example, a method for an engine may include recirculating residuals from an engine exhaust to an engine intake via an EGR system until a combustion stability is reached, and after the limit, reducing internal residuals by moving a scroll valve coupled to an outer scroll of a multi-scroll turbine to a more open position. The method further includes, while moving the scroll to the more open position, reducing an opening of a first LP-EGR valve and/or a second HP-EGR valve.

Figure 15:
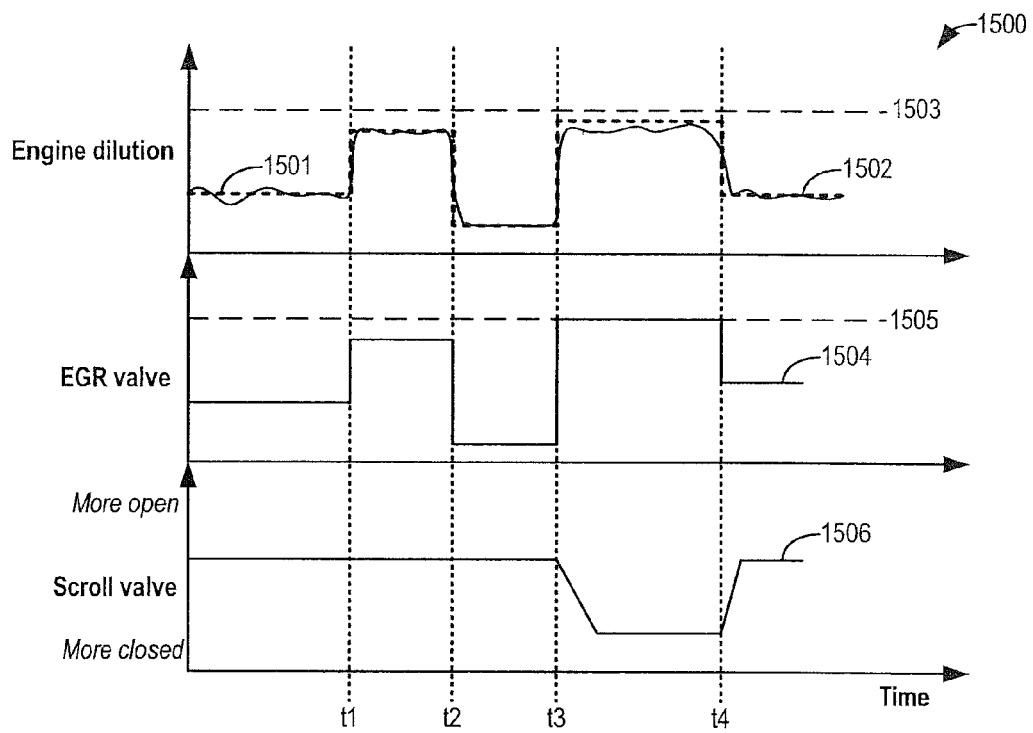

An example adjustment is now described with reference to FIG. 15. Map 1500 of FIG. 15 depicts adjusting of a scroll valve coupled to an inlet of an outer scroll of a multi-scroll exhaust turbine responsive to engine dilution. Map 1500 depicts an engine dilution requested at plot 1501 (dashed line) and an engine dilution provided at plot 1502 (solid line). Map 1500 further depicts EGR valve adjustments at plot 1504 and scroll valve adjustments at plot 1506. All plots are depicted over time, plotted along the x-axis.

Prior to t1, the engine may be operating with the scroll valve (plot 1506) at a more open position (e.g., at a fully open position). Further, the EGR valve (plot 1504) may be at a position that is based on the engine dilution needed (plot 1501) so that the requested engine dilution is provided (plot 1502). As such, the engine dilution request may include one or more of a low-pressure EGR request and a high-pressure EGR request. In one example, the engine dilution request may also include a ratio of LP-EGR to HP-EGR. In still another example, the engine dilution request may also include a ratio of internal EGR to external EGR.

At t1, based on a change in engine operating conditions, there may be an increased request for engine dilution. For example, there may be an increased demand for LP-EGR and/or HP-EGR. As such, the engine dilution needed may be within an engine combustion stability limit 1503. Accordingly, an opening of the EGR valve may be increased at t1, while maintaining a position of the scroll valve, to meet the increased engine dilution need. Increasing an opening of the EGR valve may include increasing an opening of a LP-EGR valve when the engine dilution request includes a request for more LP-EGR. Alternatively, the increasing may include increasing an opening of a HP-EGR valve when the engine dilution request includes a request for more HP-EGR. Further still, while plot 1504 shows a single EGR valve, the opening of the EGR valve may include opening of each of a LP-EGR valve and a HP-EGR valve to vary a ratio of LP-EGR and HP-EGR provided based on the engine dilution request. Then, at t2, when the engine dilution request decreases, the EGR valve opening may be correspondingly decreased.

At t3, based on a change in engine operating conditions, there may again be an increased request for engine dilution. However, to provide the desired engine dilution, at t3, the EGR valve may need to be opened beyond its opening limit 1505. Since this is not possible, the EGR valve may be fully opened and maintained at its opening limit 1505 and the remaining engine dilution need may be met by decreasing an opening of the scroll valve at t3. As such, by closing the scroll valve and using scroll valve adjustments to provide the desired dilution, engine combustion stability limits may be met, thereby improving engine performance. Then, at t4, when the engine dilution request decreases, the EGR valve opening may be decreased and the scroll valve opening may be correspondingly increased.

Herein, adjusting the scroll valve responsive to engine dilution includes adjusting the scroll valve responsive to an EGR request, the EGR request including one or more of LP-EGR, HP-EGR, or a ratio of LP-EGR to HP-EGR, the ratio based on the requested engine dilution. Further still, the scroll valve opening may be adjusted responsive to a ratio of internal EGR to external EGR, the ratio based on the requested engine dilution.

As used herein, the adjusting responsive to engine dilution includes adjusting responsive to the engine dilution request relative to the engine combustion stability limit. For example, the scroll valve may be moved to a more closed position as a request for engine dilution increases while the scroll valve is moved to a more open position as a request for engine dilution decreases.

While the depicted example suggests closing the scroll valve, in alternate examples, the scroll valve may be opened in response to the engine dilution, the adjustment (opening or closing) based not only on the engine dilution request but also on the engine EGR system configuration. In one example, wherein the engine includes an EGR system configured to recirculate exhaust gas from an engine exhaust to an engine intake, the adjusting may include, in response to an engine dilution request being higher than an engine dilution that can be provided by the EGR system, increasing an opening of the scroll valve, and in response to the engine dilution request being lower than the engine dilution that can be provided by the EGR system, decreasing the opening of the scroll valve. Herein, the EGR system may include one or more of a low-pressure EGR system including a first EGR valve and a high-pressure EGR system including a second EGR valve, and wherein one or more of the first EGR valve and the second EGR valve is adjusted based on the engine dilution request and the scroll valve adjustment. In another example, the adjusting of the scroll valve responsive to engine dilution may include increasing engine dilution by increasing opening of a valve coupled to the EGR system while increasing an opening of the scroll valve, the increasing based on each of an engine dilution request and an opening limit of the EGR valve. The adjusting responsive to engine dilution may further include decreasing engine dilution by decreasing opening of the valve coupled to the EGR system while decreasing the opening of the scroll valve, the decreasing based on each of the engine dilution request and a closing limit of the EGR valve.

In engine systems configured with an LP-EGR system, the scroll valve can be positioned to provide the turbine power required to deliver the air and external EGR to the engine. At low engine loads, the turbine power is higher with the scroll valve closed due to higher exhaust manifold pressure. At some higher engine loads (system dependent), the open scroll valve may produce more turbine power due to increased mass flow.

In the depicted embodiment, cylinder valve timing may be maintained during the increasing and decreasing opening of the scroll valve. However, in alternate embodiments, valve timing adjustments may be concurrently used alongside scroll valve adjustments to also meet the engine dilution. For example, valve timing may be adjusted to reduce valve overlap while the scroll valve opening is increased.

While not depicted in the example of FIG. 15, in further examples, a controller may adjust a wastegate coupled across the exhaust turbine responsive to the engine dilution, the wastegate adjusted based on the scroll valve adjustment and the engine dilution. The controller may also adjust various engine torque actuators, such as one or more of spark ignition timing, VCT, and intake throttle position based on the scroll valve adjustment and the engine dilution.

In this way, scroll valve adjustments may be performed responsive to engine dilution. By closing the scroll valve when EGR valve limits are reached, or opening the scroll valve when engine combustion stability is limited, an amount of residuals delivered to the engine can be managed and engine dilution can be provided without degrading engine performance.

Figure 9:
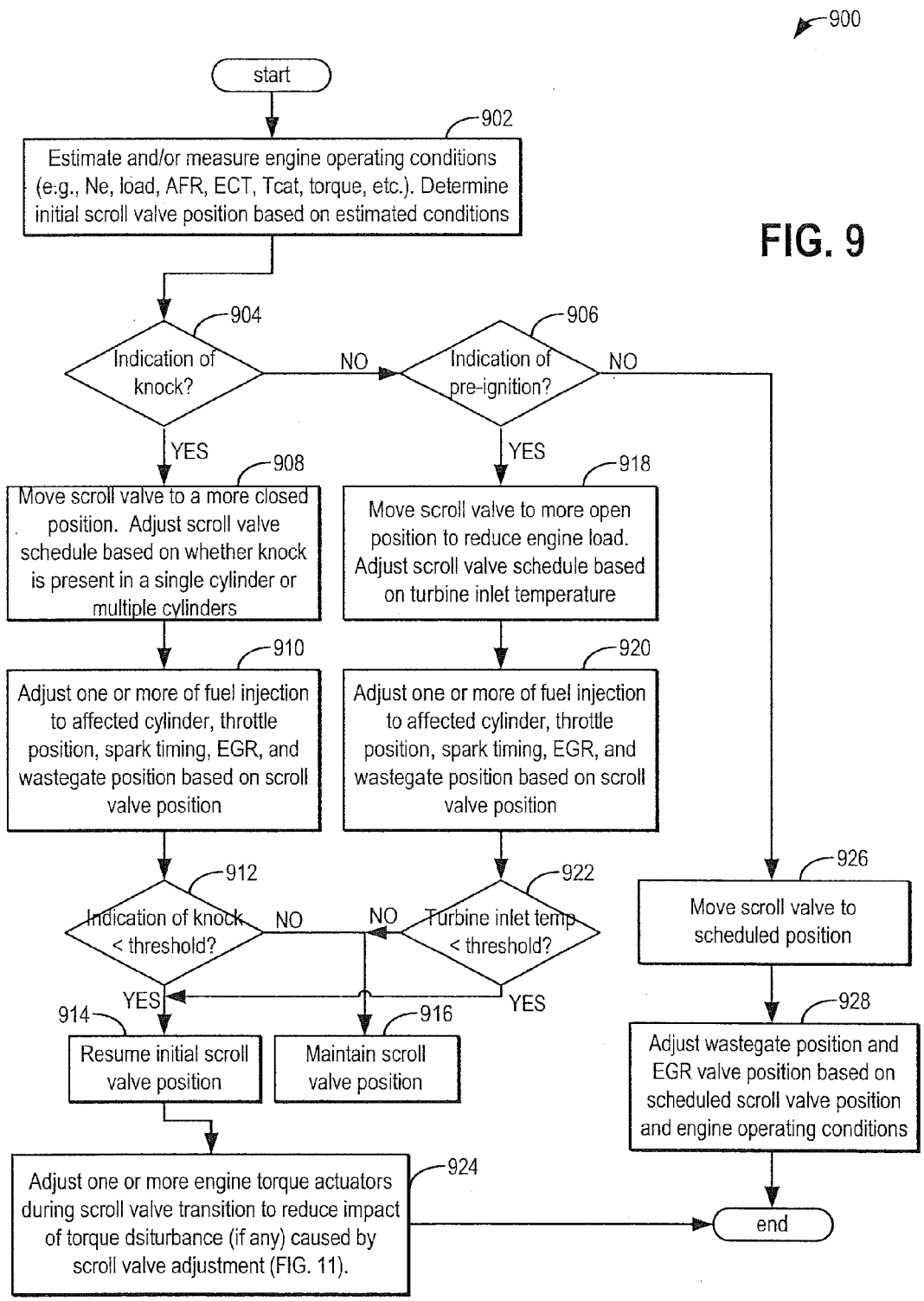
Figure 10:
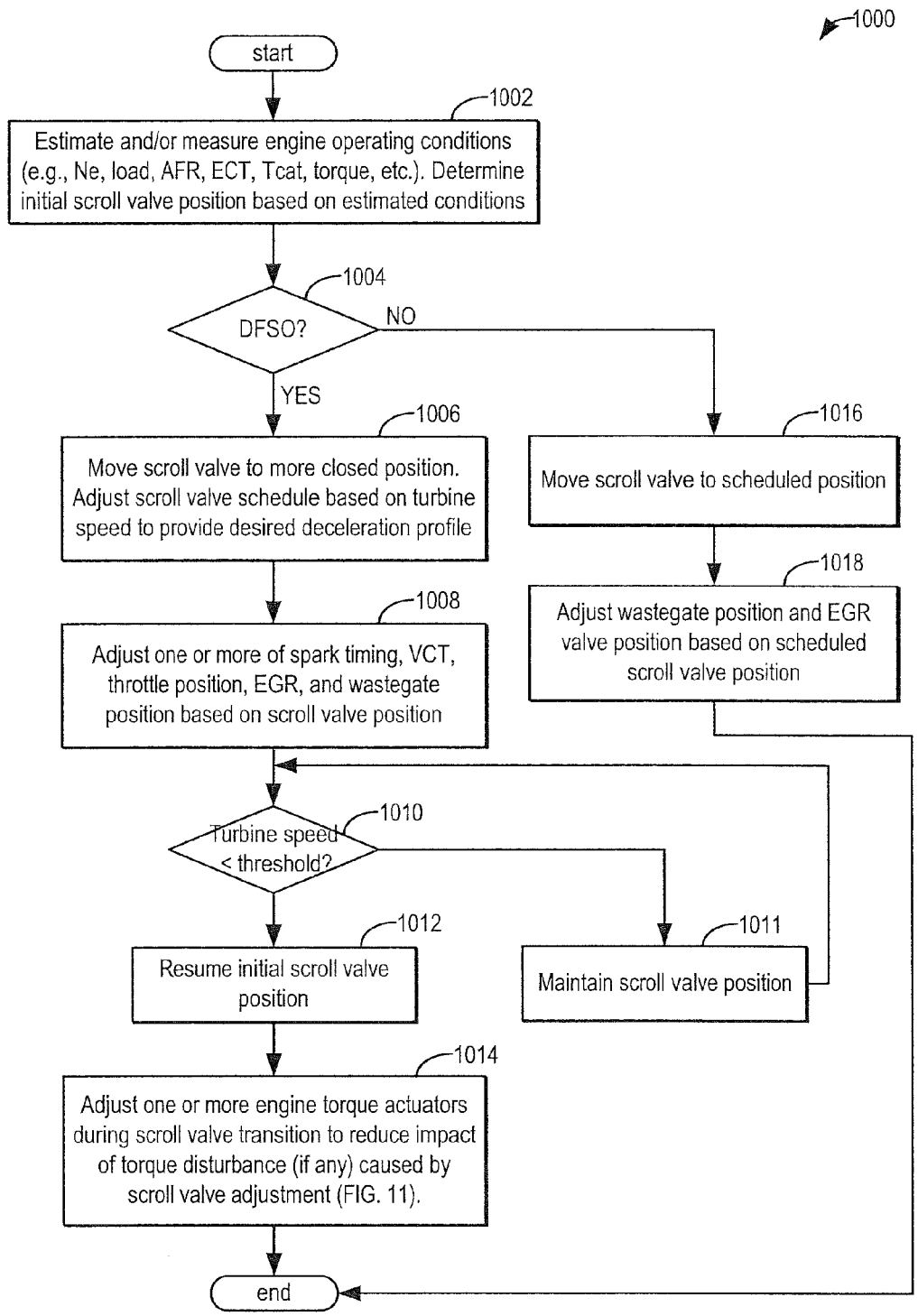

Now turning to FIG. 9, an example routine 900 is shown for adjusting a scroll valve coupled to an inlet of an outer scroll of a multi-scroll exhaust turbine in response to an indication of pre-ignition to reduce engine load and mitigate engine damage. The routine allows engine hardware to be protected from pre-ignition and other hardware limits.

At 902, the routine includes estimating and/or measuring engine operating conditions such as engine coolant temperature, exhaust catalyst temperature, torque demand, BP, MAP, MAF, etc. In addition, an initial scroll valve position may be determined based on the estimated operating conditions.

At 904, it may be determined if there is an indication of knock (without pre-ignition). If there is no indication of knock, then at 906, it may be determined if there is an indication of pre-ignition. As such, at 904 and 906, engine knock and pre-ignition may be identified and distinguished from one another. If neither knock nor pre-ignition is determined at 904 and 906, the routine proceeds to 926 wherein the scroll valve is moved to the initial position, as determined and scheduled at 902. Further, at 928, a position of a wastegate coupled across the exhaust turbine may be adjusted based on the scheduled scroll valve position and further based on the engine operating conditions so that a desired boost can be provided. Further still, the position of an EGR valve of the EGR system (including a LP-EGR valve of the LP-EGR system and an HP-EGR valve of the HP-EGR system) may be adjusted based on the scheduled scroll valve position, the wastegate position, and the engine operating conditions to provide a desired engine dilution.

In one example, the indication of knock and the indication of pre-ignition may be identified and distinguished based on the output of a knock sensor coupled to the engine block. Based on a comparison of the output relative to a threshold, and further based on a timing (e.g., in crank angle degrees) of the output, a knock or pre-ignition event may be determined. As such, engine knock may be due to an abnormal combustion event occurring in a cylinder after a spark ignition event of the cylinder while engine pre-ignition may be due to an abnormal combustion event occurring in the cylinder before a spark ignition event of the cylinder. As an example, the indication of pre-ignition at 906 may include a knock sensor output that is higher than a threshold and that is received before a cylinder ignition event. In comparison, the indication of knock at 904 may include a knock sensor output that is higher than the threshold and that is received after the cylinder ignition event. In still another example, the knock sensor output may be compared to different thresholds for identifying knock and pre-ignition. For example, the indication of knock may be based on a knock sensor output that is higher than a first threshold received in a first window while the indication of pre-ignition is based on a knock sensor output that is higher than a second threshold and that is received in a second window, the second threshold higher than the first threshold, and the second window earlier than the first window. That is, pre-ignition may result in an earlier and relatively stronger vibration, received in the cylinder before the spark event, while knock may result in a later and relatively softer vibration, received in the cylinder after the spark event.

In still further examples, the indication of pre-ignition may be based on the output of one or more of a knock sensor, a torque sensor, and a crank acceleration sensor. Further still, the indication of knock or pre-ignition may include an indication regarding the likelihood of knock or pre-ignition. For example, based on engine operating conditions and further based on engine knock or pre-ignition history, it may be inferred whether pre-ignition or knock is likely and the routine of FIG. 9 may be executed in response to the likelihood of knock or pre-ignition being higher than a threshold.

At 904, in response to the indication of knock without pre-ignition, the routine includes, at 908, increasing an opening of the scroll valve to a less open position (that is, more open that the initial position but relatively more closed relative to an opening used in response to pre-ignition) so to reduce exhaust manifold pressure and internal residuals. The adjusting in response to the indication of knock may be based on a measurement of knock intensity from a knock sensor, in-cylinder pressure measurements or other means with an opening of the scroll valve increased as the knock intensity increases. At 910, the routine includes further adjusting one or more of VCT, throttle position, spark timing, cylinder fueling and EGR delivered to the knock-affected cylinder, while adjusting the scroll valve, the adjusting based on the scroll valve adjustment. As such, these may include actuator adjustments used to address knock. For example, in response to the indication of knock, spark timing may be retarded, with the amount of spark retard applied adjusted based on the opening of the scroll valve. Thus, as the scroll valve opening is increased in response to knock, an amount of spark retard that needs to be applied to address the knock may be decreased. By using the scroll valve to address the knock, the amount of spark retard required is decreased, thereby enabling knock mitigation with reduced fuel loss and improved fuel economy.

Further still, a wastegate coupled across the exhaust turbine may be adjusted based on the scroll valve adjustment. For example, as the scroll valve is moved to a more open position, the wastegate may also be moved to a more open position. This further assists in reducing residuals and in-cylinder temperature to mitigate the knock.

At 912, it may be determined if knock has been mitigated. For example, it may be determined if the indication of knock is less than the threshold. If yes, the routine may proceed to 914 to resume the initial settings, including the initial position of the scroll valve. Alternatively, engine actuator settings and scroll valve settings may be re-adjusted based on the prevalent engine operating conditions following the mitigation of knock. If knock has not been sufficiently mitigated at 912, then at 916, the routine includes maintaining the scroll valve position. For example, the controller may maintain the scroll valve at the more open position for a duration until an in-cylinder temperature is below a threshold, and then move the scroll valve to a more closed position if desired.

Returning to 906, in response to the indication of pre-ignition, at 918, the routine includes adjusting the scroll valve to a more open position to reduce engine load. The opening of the scroll valve responsive to the indication of pre-ignition is more than the opening responsive to the indication or knock. In one example, adjusting the scroll valve to the more open position includes fully opening the scroll valve. Alternatively, the scroll valve may be opened in discrete increments (e.g., in step-wise increments of 20%). By opening the scroll valve in response to the indication of pre-ignition, exhaust manifold pressure can be reduced, thereby reducing an amount of trapped residuals in the cylinder that can contribute to further pre-ignition events. In one example, by opening the scroll valve in response to pre-ignition, engine load can be lowered from an elevated 17.5 bar level to a safer and more stable 16 bar load level within 1-2 seconds.

In one example, the adjusting of the scroll valve in response to the indication of pre-ignition may be based on exhaust manifold pressure with an opening of the scroll valve increased as the exhaust manifold pressure exceeds a threshold pressure. In another example, the adjusting of the scroll valve in response to the indication of pre-ignition may be based on a turbine inlet temperature with an opening of the scroll valve increased as the turbine inlet temperature exceeds a threshold temperature. For example, if the turbine inlet temperature is determined to be beyond a threshold temperature corresponding to a material durability limit for more than a specified duration (e.g., at or above 950° C. for more than 0.3 seconds), the scroll valve may be at least partially opened in order to rapidly reduce engine load to a safer level where engine hardware will not be degraded.

As such, the threshold temperature at which the turbine inlet is limited may vary at different scroll openings. For example, the thermal stresses may be higher when the scroll valve is fully closed. Accordingly, a lower temperature threshold may be applied (e.g., 850° C.) when the scroll valve is closed while a higher temperature threshold is applied (e.g., 950-1000° C.) when the scroll valve is open.

In a further example, the adjusting of the scroll valve in response to the indication of pre-ignition may be based on the intensity or frequency of the pre-ignition, an opening of the scroll valve increased as the intensity or frequency of pre-ignition increases. In yet another example, the adjusting of the scroll valve in response to the indication of pre-ignition may be based on engine speed with the opening of the scroll valve increased as the engine speed decreases. Further still, the adjusting of the scroll valve in response to the indication of pre-ignition may be based on an air temperature including an ambient air temperature or a manifold air temperature, the opening of the scroll valve increased as the air temperature increases. In still another example, the adjusting of the scroll valve in response to the indication of pre-ignition may be based on one or more of ambient humidity and fuel octane content, the opening of the scroll valve increased as the humidity decreases, the opening of the valve increased as the fuel octane content/rating decreases.

At 920, the routine includes further adjusting one or more of VCT, throttle position, spark timing, cylinder fueling and EGR delivered to the knock-affected cylinder, while adjusting the scroll valve, the adjusting based on the scroll valve adjustment. As such, these may include actuator adjustments used to address pre-ignition. For example, in response to the indication of knock, cylinder fuel injection may be enriched the cylinder, with the cylinder enrichment adjusted based on the opening of the scroll valve. Thus, as the scroll valve opening is increased in response to pre-ignition, an amount cylinder fuel enrichment that needs to be applied to address the pre-ignition may be decreased. By using the scroll valve to address the pre-ignition, the amount of enrichment required is decreased, thereby enabling pre-ignition mitigation with reduced fuel loss and improved fuel economy.

Further still, a wastegate coupled across the exhaust turbine may be adjusted based on the scroll valve adjustment. For example, as the scroll valve is moved to a more open position, the wastegate may also be moved to a more open position. This further assists in reducing engine load, exhaust manifold pressure, and turbine inlet temperature to mitigate the pre-ignition.

It will be appreciated that there may be selected engine operating conditions, such as selected engine speed-load conditions, wherein only a wastegate adjustment can be used (in place of, and similar to a scroll valve adjustment) to control the exhaust manifold pressure. For example, in response to the indication of pre-ignition, only a wastegate adjustment can be used to reduce exhaust manifold pressure and engine load to mitigate the pre-ignition. However, even if wastegate adjustments are possible, scroll valve adjustments may be advantageous even in those operating conditions. As one example, scroll valve adjustments may enable the active controls of the wastegate to be decoupled from the control of the scroll valve and the pre-ignition mitigation. For example, based on control forces and valve authority (that is, based on authority of wastegate relative to scroll valve), one or the other of the scroll valve and the wastegate may be selected for pre-ignition control. For example, during a first pre-ignition condition, where the wastegate has higher authority, the wastegate may be opened to reduce engine load and mitigate the pre-ignition while during a second, different pre-ignition condition, where the scroll valve has higher authority, the scroll valve may be opened to reduce engine load and mitigate the pre-ignition. During a third pre-ignition condition, where the wastegate and the scroll valve have substantially similar authority, one of the two may be selected (e.g., the scroll valve is opened while the wastegate is closed or the wastegate is opened while the scroll valve is closed). Alternatively, each of the scroll valve and the wastegate may be at least partially opened to reduce the engine load. This provides less boost, lowers the engine load and mitigates the occurrence of pre-ignition.

At 922, it may be determined if pre-ignition has been mitigated and there is no further indication of pre-ignition. For example, it may be determined if the turbine inlet temperature is less than a threshold. Alternatively, it may be determined if the exhaust manifold pressure is less than a threshold. If yes, the routine may proceed to 914 to resume the initial settings, including the initial position of the scroll valve. For example, the controller may open the scroll valve in response to the indication of pre-ignition, maintain the scroll valve at the more open position for a duration until the exhaust manifold pressure is below a threshold, and after the exhaust manifold pressure has been lowered and if there is no further indication of pre-ignition, move the scroll valve to a more closed position. Alternatively, engine actuator settings and scroll valve settings may be re-adjusted based on the prevalent engine operating conditions following the mitigation of pre-ignition.

If pre-ignition has not been sufficiently mitigated at 922, then at 916, the routine includes maintaining the scroll valve position. For example, the controller may maintain the scroll valve at the more open position for a duration until the turbine inlet temperature, or the exhaust manifold pressure, is below the respective threshold. Then, after the temperature or pressure has been sufficiently lowered, the scroll valve may be moved to a more closed position. For example, after the turbine inlet temperature is below the threshold temperature, the controller may at least partially close the scroll valve, with the scroll valve closing based on turbine speed or measured boost pressure. In one example, at least partially closing the scroll valve includes moving the scroll valve from the more open position to a fully closed position.

From 914 or 916, the routine proceeds to 924 where the routine includes adjusting one or more engine actuators during the scroll valve transition to reduce any impact of a torque disturbance resulting from the scroll valve adjustment. For example, the routine may include adjusting one or more of a wastegate coupled to the exhaust turbine, spark ignition timing, VCT, positive valve overlap, and intake throttle opening while moving the scroll valve to the more open position. As elaborated with reference to FIG. 11, the actuator adjustment may be used to better mask any torque surge/dip that may arise during the scroll valve adjustment, thereby improving the vehicle operator's drive feel. In one example, a timing of adjusting the scroll valve is based on a transmission event to reduce the torque impact.

In some embodiments, the scroll valve may be opened responsive to both engine pre-ignition and knock, however the opening responsive to pre-ignition may be more than the opening responsive to knock. For example, in response to the indication of pre-ignition, the scroll valve may be adjusted to a first open position while in response to an indication of knock, the scroll valve is adjusted to a second open position, the second position less open than the first position.

It will be appreciated that while the routine of FIG. 9 describes scroll valve adjustments responsive to knock or pre-ignition, similar scroll valve adjustments may be applied in response to other engine hardware limits being met or approached. For example, scroll valve adjustments may be used in response to a turbine inlet temperature (e.g., as estimated by a thermocouple) approaching a limit determined by the material of the turbine, an exhaust valve temperature approaching a limit determined by the material of the exhaust valve, a peak cylinder pressure (e.g., as estimated by a cylinder pressure transducer) approaching a limit determined by the combination of temperature and material of the exhaust valve, or a turbocharger speed (e.g., as estimated by a proximity sensor) approaching a limit. As such, each parameter may be estimated or inferred based on a model. In each case, when the limit is met or approached, the scroll valve may be adjusted in a direction that reduces engine load, thereby reducing engine damage. Further, wastegate adjustments may be coordinated with the scroll valve adjustment to reduce degradation of the engine, turbocharger, and catalyst.

In one example, an engine system comprises an engine and a turbocharger for providing a boosted aircharge to the engine, the turbocharger including an intake compressor and an exhaust turbine. The exhaust turbine may include a first outer and a second inner scroll and a scroll valve may be coupled between an engine exhaust manifold and an inlet of the first outer scroll, but not the inner scroll. A wastegate may be included in a bypass coupled between an inlet and an outlet of the turbine. A knock sensor may be coupled to the engine for identifying and differentiating cylinder knock and cylinder pre-ignition. An engine controller may be configured with computer readable instructions for indicating cylinder pre-ignition based on an output of the knock sensor, and in response to the indication of pre-ignition, the controller may increase an opening of the scroll valve based on turbine inlet temperature. The increasing may include, as the turbine inlet temperature exceeds a threshold, increasing an opening of the scroll valve towards a fully open position, and as the turbine inlet temperature falls below the threshold, decreasing the opening of the scroll valve towards a fully closed position. Further, the controller may adjust an opening of the wastegate based on the opening of the scroll valve, the wastegate moved to a more open position as the opening of the scroll valve is increased.

In this way, scroll valve adjustments may be advantageously used to rapidly reduce engine load in response to engine hardware limits being reached. By opening the scroll valve and optionally a wastegate in response to an indication of pre-ignition (such an indication regarding a likelihood of pre-ignition), exhaust manifold pressures and turbine inlet temperatures can be quickly decreased, reducing the risk of imminent pre-ignition and engine damage.

Figure 13:
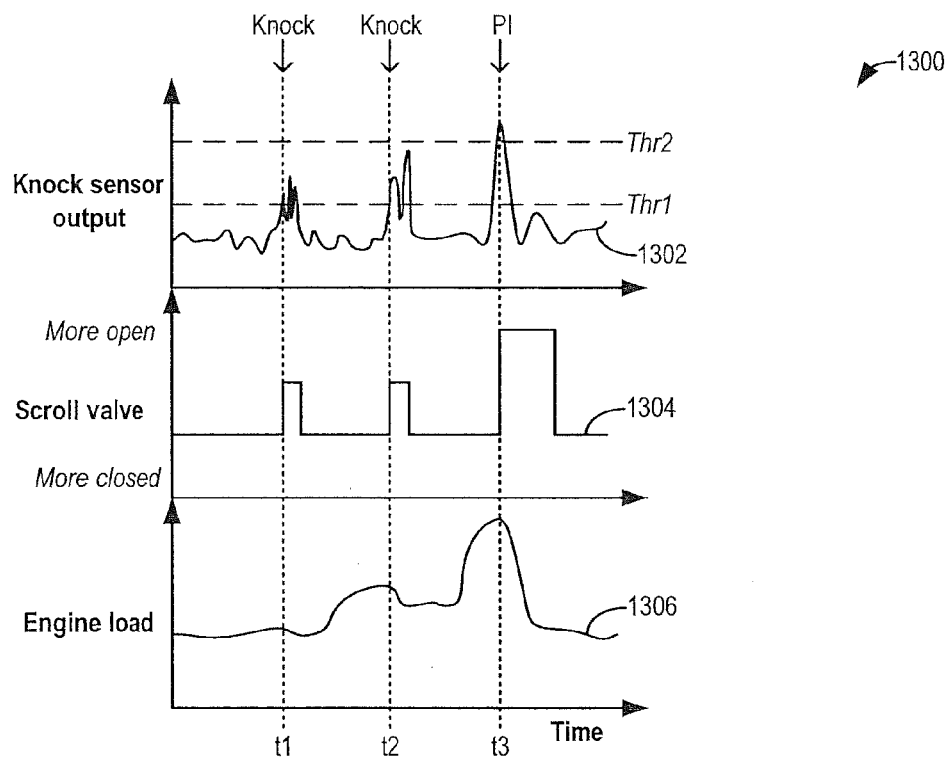

An example adjustment is now described with reference to FIG. 13. Map 1300 of FIG. 13 depicts adjusting of a scroll valve coupled to an inlet of an outer scroll of a multi-scroll exhaust turbine responsive to engine hardware limit (specifically, in response to knock and pre-ignition in the present example). Map 1300 depicts a knock sensor output at plot 1302, scroll valve adjustments at plot 1304, and changes to an engine load at plot 1306. All plots are depicted over time, plotted along the x-axis.

Prior to t1, the engine may be operating with the scroll valve (plot 1304) at a more closed position (e.g., at a fully closed position). At t1, in response to an engine knock sensor output (plot 1302) being higher than a first threshold Thr1 but lower than a second threshold Thr2, knock may be determined. In response to the indication of engine knock, the scroll valve may be moved to a more open position and may be maintained in the more open position for a duration until the indication of knock is below the first threshold. After the duration has elapsed and the indication of knock is below the first threshold, the scroll valve may be returned to the more closed position. As such, by opening the scroll valve in response to knock, the engine load may be reduced.

In addition to the scroll valve adjustment, the engine knock may be mitigated by retarding spark timing (not shown).

Between t1 and t2, engine speed-load conditions may change and the engine may be operating at high engine load conditions where knock is likely. At t2, in response to the engine knock sensor output again being higher than the first threshold Thr1 but lower than a second threshold Thr2, knock may be determined. The indication of knock at t2 may be higher than the indication of knock at t1. In response to the indication of engine knock at t2, the scroll valve may be moved to a more open position (e.g., the same more open position as in response to the indication of knock at t1) and may be maintained in the more open position for a duration until the indication of knock is below the first threshold. Herein, due to the indication of knock at t2 being higher than the corresponding indication at t1, the scroll valve may be kept open for a longer duration. Then, after the duration has elapsed, the scroll valve may be returned to the more closed position. In addition to the scroll valve adjustment, the engine knock may be mitigated by retarding spark timing (not shown).

Between t2 and t3, engine speed-load conditions may change and the engine may be operating at low speed and high engine load conditions where pre-ignition is likely. At t3, in response to the engine knock sensor output (plot 1302) being higher than each of the first threshold Thr1 and second threshold Thr2, pre-ignition may be determined. In response to the indication of engine pre-ignition, the scroll valve may be moved to a more open position and may be maintained in the more open position for a duration until the indication of pre-ignition is below each of the first and second threshold. Specifically, an opening of the scroll valve responsive to the indication of pre-ignition may be higher (that is, more open) than the opening of the scroll valve responsive to the indication of knock. For example, in response to knock, the scroll valve may be partially opened while in response to pre-ignition, the scroll valve may be fully opened. Further, the duration for which the scroll valve is opened responsive to the indication of pre-ignition may be longer than the duration of scroll valve opening responsive to the indication of knock. For example, in response to knock, the scroll valve may be opened until the indication of knock has reduced and then the valve may be closed. In comparison, in response to pre-ignition, the scroll valve may be maintained open for a while even after the indication of pre-ignition has reduced, as shown.

After the longer duration has elapsed and the indication of pre-ignition is below each of the first and second threshold, the scroll valve may be returned to the more closed position. As such, by opening the scroll valve in response to pre-ignition, the engine load may be quickly reduced from the higher load region to a medium-low load region. In doing so, the likelihood of further pre-ignition events is reduced. In addition to the scroll valve adjustment, the pre-ignition may be mitigated by enriching cylinder fuel injection for the duration (not shown).

While not depicted in the example of FIG. 13, in further examples, a controller may adjust a wastegate coupled across the exhaust turbine responsive to the indication of pre-ignition or knock, the wastegate adjusted based at least on the scroll valve adjustment. The controller may also adjust various engine torque actuators, such as one or more of spark ignition timing, VCT, EGR (LP-EGR and/or HP-EGR), and intake throttle position based on the scroll valve adjustment.

In this way, scroll valve adjustments may be performed responsive to engine hardware limits being met or approached. By opening the scroll valve to immediately reduce an engine load, engine components may be protected from degradation and engine life may be extended.

Now turning to FIG. 10, an example routine 1000 is shown for adjusting a scroll valve coupled to an inlet of an outer scroll of a multi-scroll exhaust turbine in response to an indication of engine deactivation. The adjustment enables turbine response during a subsequent tip-in to be improved. By closing the scroll valve and wastegate during DFSO, the turbine speed is maximized and the actuators are pre-positioned for best transient response on tip-in. Because the fuel is off, the increase in exhaust manifold pressure does not result in higher fuel consumption At 1002, the routine includes estimating and/or measuring engine operating conditions such as engine coolant temperature, exhaust catalyst temperature, torque demand, BP, MAP, MAF, etc. In addition, an initial scroll valve position may be determined based on the estimated operating conditions. At 1004, an indication of engine deactivation may be confirmed. In the depicted example, the indication of engine deactivation includes a deceleration fuel shut-off event (DFSO). The DFSO event may be in response to torque demand being lower than a threshold, such as during a tip-out. Therein, cylinder fuel injection may be selectively stopped. In an alternate example, where the engine is configured to be selectively deactivated in response to idle-stop conditions, engine deactivation may be confirmed in response to an idle-stop operation being performed where cylinder fuel injection is deactivated while spark is also deactivated. As such, following engine deactivation, the engine may still be rotating, the vehicle may still be traveling, and the torque demand at the vehicle wheels may be negative. Further, the engine may spin towards rest un-fueled.

If engine deactivation is not confirmed, the routine proceeds to 1016 wherein the scroll valve is moved to the initial position, as determined and scheduled at 1002. Further, at 1018, a position of a wastegate coupled across the exhaust turbine may be adjusted based on the scheduled scroll valve position and further based on the engine operating conditions so that a desired turbine and/or engine speed deceleration profile can be provided. Further still, the position of an EGR valve of the EGR system (including a LP-EGR valve of the LP-EGR system and an HP-EGR valve of the HP-EGR system) may be adjusted based on the scheduled scroll valve position, the wastegate position, and the engine operating conditions to provide a desired engine deceleration profile.

If engine deactivation is confirmed, then at 1006, the routine includes in response to the indication of engine deactivation, moving the scroll valve to a more closed position. For example, the scroll valve may be moved to a fully closed position. As such, the scroll valve may be coupled to only a first, outer scroll of the multi-scroll exhaust turbine but not to a second inner scroll of the turbine. In one example, the valve may be moved to the more closed position based on one or more of turbine speed and boost pressure during the engine deactivation. Specifically, the valve may be moved based on a difference between an estimated or measured turbine speed during the engine deactivation relative to a desired turbine speed deceleration profile and/or the difference between a measured or estimated boost pressure relative to a desired boost pressure, the valve moved to a more closed position (e.g., towards the fully closed position) as the difference increases. The desired turbine speed deceleration profile may allow the turbine speed to be maintained above a threshold level for a duration of the engine spin-down. By maintaining the turbine speed, exhaust manifold pressure can be maintained elevated during the spin-down. The increased exhaust manifold pressure reduces the air flow through the engine during the deceleration, thereby reducing exhaust catalyst cooling. As such, this reduces an amount of fuel enrichment required during a subsequent engine operation to reactivate the exhaust catalyst, providing fuel economy improvements.

At 1008, the routine further includes moving a wastegate coupled across the exhaust turbine to a more closed position, the position of the wastegate based on the position of the scroll valve. Moving the wastegate may include moving the wastegate concurrently with the scroll valve or sequentially with the scroll valve, an order of the sequential moving based at least on a relative authority of the wastegate and the scroll valve under the given engine operating conditions. For example, during a first condition where both the scroll valve and the wastegate have comparable authorities, the controller may move the wastegate to a more closed position as the scroll valve is moved to the more closed position. During a second condition, where the scroll valve has higher authority, the controller may move the wastegate to the more closed position after the valve is moved to the more closed position. During a third condition, where the wastegate has higher authority, the routine includes moving the wastegate to the more closed position before the scroll valve is moved to the more closed position.

In addition, at 1008, the routine may include adjusting one or more of VCT, valve timing, EGR, and an intake throttle position during the engine deactivation based on the moving of the scroll valve. For example, the controller may adjust intake and exhaust valve timing during the deceleration to decrease valve overlap. The controller may also adjust the EGR valves to reduce an amount of residuals delivered to the engine intake during the deceleration. The engine settings may be adjusted to maximize engine torque response after exit from DFSO. These may include reducing or stopping EGR, and moving VCT to a timing for optimum combustion stability with scroll valve closed.

At 1010, it may be determined if the turbine speed is below a threshold speed. During a DFSO, the scroll valve and wastegate may be closed to maximize turbocharger response on exit from DFSO. In alternate embodiments, it may be determined if the engine speed is below a threshold speed. For example, it may be determined if the engine has spun substantially to rest. If the turbine speed has not reduced below the threshold, then at 1011, the routine includes maintaining the scroll valve in the closed position or continuously adjusting the scroll valve position until the turbine speed has reduced according to the desired deceleration profile.

As an example, as a difference between an estimated or measured turbine speed and a desired spin-down turbine speed profile increases, the closing of the scroll valve towards a fully closed position may be increased (that is, the valve may be moved to a more closed position). A closing of the wastegate may be coordinated during the engine spin-down based on the closing of the scroll valve to further reduce the difference between the estimated or measured turbine speed and the desired spin-down turbine speed profile. Likewise, where the engine system include an EGR system for recirculating exhaust gas from the exhaust manifold to an intake manifold of the engine, the controller may further adjust an EGR valve of the EGR system to decrease an amount of EGR during the closing of the scroll valve (and/or the wastegate). In addition cam timing will be adjusted for optimum combustion stability, this lowers fresh air flow through the unfueled cylinders thereby reducing exhaust catalyst cooling. As such, adjusting VCT for lower volumetric efficiency may also reduce catalyst cooling, but EGR may not have that effect because the EGR is fresh air when in DFSO. Further, by enabling the turbine speed to be maintained above a threshold speed for a duration of the engine deactivation (and spin-down), turbine spin-up during a subsequent engine activation can be expedited, enabling better boost control.

If the turbine speed has reduced below the threshold speed, then at 1012, an initial scroll valve position may be resumed. Alternatively, a default engine rest or DFSO scroll valve position may be resumed. In one example, this includes moving the scroll valve to a fully closed position (if it has not already reached that position). Alternatively, if the scroll valve is already at the fully closed position, the routine includes maintaining the scroll valve at the fully closed position. In still other examples, the scroll valve may be moved to a fully open position, at least temporarily.

In one embodiment, the position resumed at 1012 may be based on the duration of the DFSO. For example, in response to DFSO conditions being met, while fuel is deactivated, a timer may be started. In the event of a shorter DFSO, where the duration elapsed on the timer is less than a threshold amount of time, the controller may temporarily move the scroll valve to a fully open position to clear out residuals from the cylinder, and then return the scroll valve to the fully closed position. During a subsequent engine restart, the engine may be started with the scroll valve closed to improve boost response (such as responsive to a tip-in, as elaborated in the routine of FIG. 7). In the event of a longer DFSO, where the duration elapsed on the timer is more than a threshold amount of time, the controller may maintain the scroll valve at a fully closed position so that the turbine is maintained at a speed range from where the turbine can be quickly spun-up during a subsequent engine start. For example, during a first engine restart from the engine spin-down, a controller may restart the engine with the scroll valve closed while during a second engine restart from the spin-down, the controller may restart the engine with the scroll valve open. Herein, a duration of engine deactivation preceding the first engine restart may be longer than the duration of engine deactivation preceding the second engine restart. This allows boost response during the engine restart to be improved.

At 1014, the routine includes adjusting one or more engine actuators during the scroll valve transition to reduce any impact of a torque surge/dip resulting from the scroll valve adjustment. For example, the routine may include adjusting one or more of a wastegate coupled to the exhaust turbine, VCT, positive valve overlap, and intake throttle opening while moving the scroll valve to the more closed position. As elaborated with reference to FIG. 11, the actuator adjustment may be used to better mask any torque disturbances that may arise during the scroll valve adjustment, thereby improving the vehicle operator's drive feel. In one example, a timing of adjusting the scroll valve is based on a transmission event during the engine spin-down to better mask the impact of a torque surge.

Figure 16:
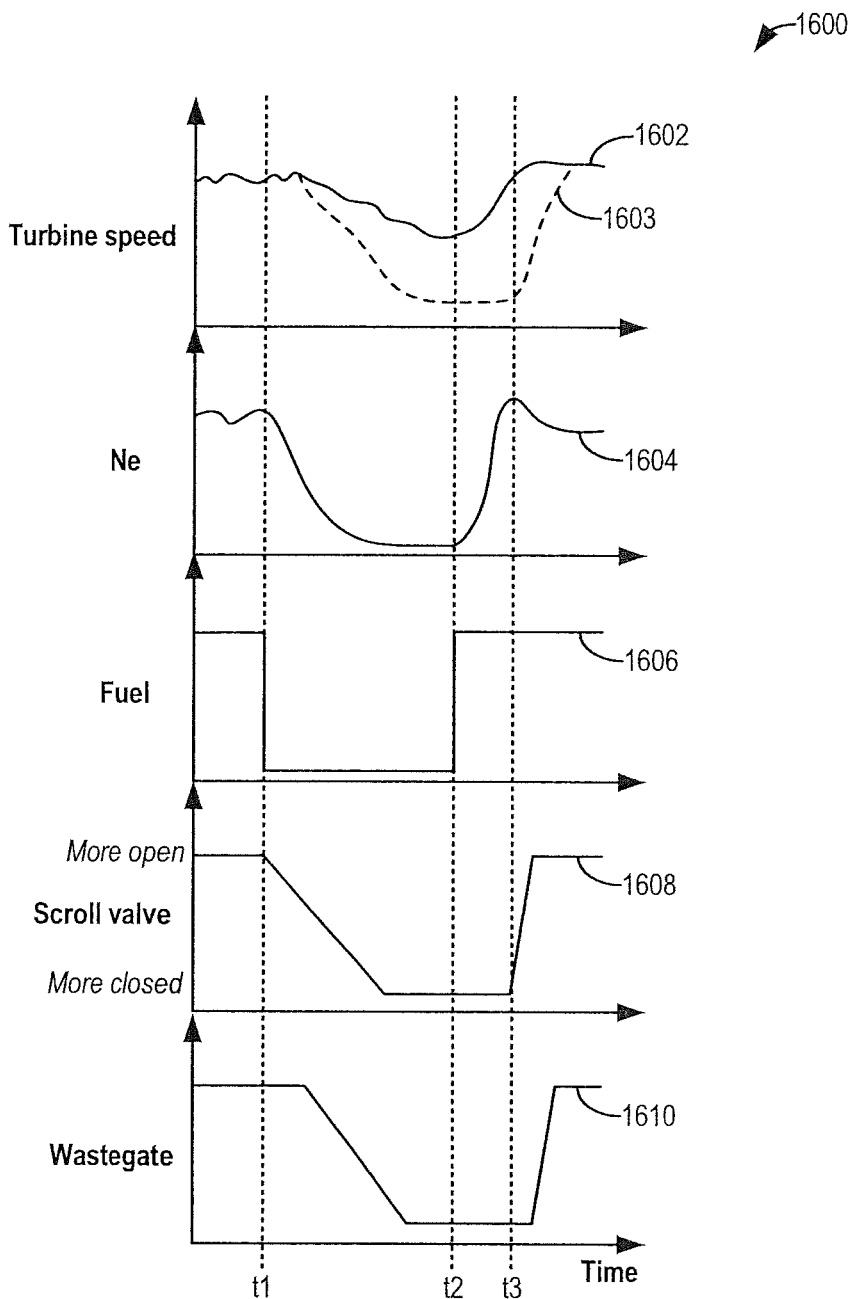

An example adjustment responsive to engine deactivation is now described with reference to FIG. 16. Map 1600 of FIG. 16 depicts adjusting of a scroll valve coupled to an inlet of an outer scroll of a multi-scroll exhaust turbine responsive to engine deactivation, specifically, in response to a DFSO event in the present example. Map 1600 depicts turbine speed at plot 1602, engine speed at plot 1604, cylinder fueling at plot 1606, scroll valve adjustments at plot 1608, and wastegate adjustments at plot 1610. All plots are depicted over time, plotted along the x-axis.

Prior to t1, the engine may be operating fueled (plot 1606) and each of the scroll valve and wastegate may be at a more open position. For example, each of the scroll valve and the wastegate may be at a fully open position. At t1, engine deactivation conditions may be met. For example, at t1, a vehicle operator may tip-out and/or apply wheel brakes. In response to the reduced torque demand, fuel injection to the engine cylinders may be selectively deactivated. Due to the deactivation, the engine may start spinning towards rest (plot 1604).

While the engine is spinning down, the scroll valve may be moved towards a more closed position (e.g., towards a fully closed position). In the depicted example, the scroll valve is shown being gradually moved to the fully closed position. However, in alternate examples, the scroll valve may be immediately moved to a fully closed position, concurrent with the cylinder fuel deactivation. The closing of the scroll valve (plot 1608) may be adjusted based on turbine speed (plot 1602) so that a desired turbine speed deceleration profile can be provided. As such, the desired turbine speed deceleration profile enables the turbine speed to remain above a threshold speed for a longer duration of the engine deactivation. In other words, turbine spin-down to rest following engine deactivation is slowed down. By keeping the turbine spinning, an exhaust manifold pressure can be maintained, which in turns reduces air flow through the engine. The reduced air flow decreases cooling of the exhaust catalyst and depletion of catalytic sites with oxygen.

The scroll valve closing is gradually increased (as depicted, or immediately decreased in an alternate example) after t1 until the scroll valve is at a fully closed position, after which the scroll valve is maintained at the fully closed position. In addition to scroll valve adjustments, wastegate adjustments may be used to assist in providing the desired turbine speed deceleration profile. In the depicted example, the wastegate may also be closed in response to the engine deactivation, the closing of the wastegate following the closing of the scroll valve. Specifically, due to a higher authority of the scroll valve, the scroll valve may start being moved towards a fully closed position at t1 while the wastegate may start being moved towards a fully closed position shortly after t1 (after a delay since the moving of the scroll valve towards the closed position). While the example shows the wastegate being gradually closed, in alternate examples, the wastegate may be immediately closed. In still further examples, such as where the wastegate has higher authority, the wastegate may be immediately closed concurrently with the immediate closing of the scroll valve and the deactivating of fuel to the cylinders (e.g., at t1).

Just before t2, the engine may have spun to rest. In addition, each of the scroll valve and the wastegate may be at the fully closed position. At t2, engine reactivation conditions may be met. For example, the vehicle operator may tip-in and/or release wheel brakes. In response to the increased torque demand, cylinder fueling may be resumed (plot 1606). In addition, the scroll valve may be kept closed for a duration of the restart, between t2 and t3, until the turbine speed has been raised above a threshold speed. By keeping the scroll valve closed during an early part of the restart, turbine spin-up is expedited, reducing turbo lag and improving turbocharger performance upon restart. Then, at t3, the scroll valve may be gradually moved to a more open position, for example, towards a fully open position.

The wastegate may also be kept closed during the early part of the restart to further assist in expediting turbine spin-up. Then, once the turbine has sufficiently spun up, the wastegate may be opened. In the depicted example, the wastegate is kept closed during the engine restart. Then, shortly after t3 (after a delay since the moving of the scroll valve towards the more open position), the wastegate is also moved towards the more open position.

As such, if the scroll valve was not closed during the engine deactivation and maintained closed during at least a portion of the subsequent engine reactivation, the turbine speed may drop faster during the engine deactivation and take a longer time to spin-up during the subsequent engine reactivation, as shown by segment 1603 (dashed line). The delay in spinning up the turbine may result in turbo lag that reduces turbocharger performance during the restart.

While the depicted example shows wastegate adjustments succeeding scroll valve adjustments, in alternate embodiments, based on engine operating conditions, wastegate adjustments may be concurrent with or may precede scroll valve adjustments. Further, while not depicted in the example of FIG. 16, in other examples, a controller may adjust various engine torque actuators, such as one or more of VCT, valve overlap, EGR and intake throttle position based on the scroll valve adjustment during the engine spin-down and the subsequent restart.

In this way, scroll valve adjustments may be performed responsive to engine deactivation conditions. By closing the scroll valve while the engine spins down, turbine speed may be better managed and turbocharger control may be improved.

Now turning to FIG. 11, an example routine 1100 is shown for adjusting a timing of a scroll valve adjustment based on an engine transmission event to reduce the impact, if any, of a torque surge associated with the scroll valve adjustment. The routine allows such a torque surge to be better masked, improving the quality of the vehicle operator's drive experience.

At 1102, the routine includes determining the scroll valve adjustment requested. For example, the controller may determine whether the scroll valve is to be moved to a more open position (e.g., to a fully open position) or to a more closed position (e.g., to a fully closed position). As previously elaborated, the engine may include a second scroll inner to the first scroll, the scroll valve coupled only to the first scroll. The scroll valve adjustment may lead to transitioning of a restriction in exhaust upstream of the first scroll. As such, a transitioning of an opening of the scroll valve based on various operating conditions and operating limits leads to a transitioning in a restriction in exhaust upstream of a first scroll of a multi-scroll exhaust turbine based on various operating conditions and operating limits. These may include, for example, as elaborated with reference to FIGS. 5-10, cold-start conditions, engine dilution conditions, pre-ignition conditions, combustion stability limits, hardware limits, etc. Scroll valve adjustments may include, at lower turbine speeds, closing the scroll valve to increase restriction in exhaust upstream of the first scroll, and at higher turbine speeds, opening the scroll valve to decrease the restriction.

At 1104, a torque change associated with the scheduled scroll valve adjustment is determined. As such, the torque change may include a torque surge or a torque dip. For example, at moderate to high boost flow and airflow conditions, when the scroll valve is opened (at constant cam timing), exhaust flow is allowed to go through both scrolls. As a result the exhaust manifold pressure rapidly decreases, causing more fresh air to be trapped in the cylinders. If this increase in airflow is matched by fuel to maintain constant air-fuel ratio and ignition timing, the opening of the scroll valve produces a "bump" up in engine torque, herein also referred to as a torque bump or torque surge. In a similar fashion, if the engine is at a moderate to high airflow, and the scroll valve is closed to help spool up the turbine, the elevated exhaust manifold pressure will cause the trapped aircharge to suddenly decrease, while also reducing further fresh air flow into the engine. If this decrease in airflow is matched by fuel to maintain constant air-fuel ratio and ignition timing, the closing of the scroll valve produces a "bump" down in engine torque, herein also referred to as a torque bump or torque dip. In either case, the torque disturbance, or torque bump, leads to poor drivability. As elaborated below, an engine controller may be configured to adjust an engine actuator during the scroll valve transition to maintain engine torque and reduce the impact of the torque bump.

At 1106, it may be determined if a torque bump is expected. Specifically, based on the estimation of a torque change associated with the scheduled scroll valve adjustment, it may be determined if a torque surge or torque dip is expected. In one example, a torque surge may be confirmed if the torque change associated with the scheduled scroll valve adjustment is a positive change that is more than a threshold amount. In another example, a torque dip may be confirmed if the torque change associated with the scheduled scroll valve adjustment is a negative change that is more than a threshold amount.

If a torque bump is not expected, then at 1108, the routine includes maintaining the position of one or more engine actuators. Further, the scroll valve adjustment is performed as scheduled (e.g., at a timing based on the estimated operating conditions).

If a torque bump is expected, then at 1110, it may be determined if there is an upcoming transmission event. The controller may determine if there is an upcoming transmission event based on the shift schedule of the transmission. The upcoming transmission event may include an upcoming transmission upshift event or an upcoming transmission downshift event. As such, the engine transmission may include a manual transmission or an automatic transmission. The transmission may further include one or more clutches such as a torque converter clutch, and a forward clutch. The one or more clutches may include a mechanical clutch that is mechanically actuated, as well as an "e-clutch" that is electronically actuated (that is, a clutch-by-wire).

In some embodiments, in determining if there is an upcoming transmission event, the controller may determine a duration between the upcoming transmission event (based on a shift schedule of the transmission) and a time when a request for transitioning restriction at the scroll valve is received. If the duration is sufficiently long (e.g., longer than a threshold duration), an upcoming transmission event may not be confirmed. If the duration is sufficiently short (e.g., shorter than a threshold duration), an upcoming transmission event may be confirmed.

If an upcoming transmission event is confirmed, then at 1116, the routine includes adjusting a timing of the transitioning based on a transmission event. The adjusting may include, in response to an upcoming transmission event, timing the transitioning to at least partially overlap the transmission event. For example, if a duration between the transmission event and a request for transitioning restriction is smaller than a threshold, the timing of the scroll valve transitioning may be adjusted to be during the transmission event (e.g., concurrent with the transmission event). In another example, the timing may be adjusted so that the timing of the transitioning immediately follows the transmission event. By timing the transitioning to at least partially overlap the transmission event, the impact of the torque bump can be better masked, thereby improving driveability.

At 1118, the routine includes adjusting an engine actuator during the scroll valve transition to maintain engine torque and reduce the impact of a torque bump that would have been experienced during the transition. The engine actuator adjusted may include one or more of VCT, EGR, valve timing (including adjusting a valve overlap), intake throttle position, wastegate, and transmission shift schedule. In each case, the engine actuator adjustment may be based on the transitioning of the scroll valve opening and the change in restriction in exhaust upstream of the first scroll. For example, the engine actuator may be adjusted to transiently increase engine airflow when the scroll valve is closed to increase restriction, and the engine actuator may be adjusted to transiently decrease engine airflow when the scroll valve is opened to decrease restriction. Alternatively, the engine actuator may be adjusted to increase engine airflow when the scroll valve is transitioned by a large amount to a more open position or to a more closed position. In this way, a restriction in exhaust upstream of a first scroll of a multi-scroll exhaust turbine may be transitioned based on operating conditions while adjusting an engine actuator during the transition to maintain engine torque during the transition.

As another example, when closing the scroll valve to increase restriction, an engine actuator may be adjusted to transiently increase engine air flow. This transient increase in engine air flow may compensate for the transient drop in air flow experienced when the scroll valve is closed and the exhaust manifold pressure is increased. As another example, when opening the scroll valve to decrease restriction, the engine actuator may be adjusted to transiently decrease engine air flow. This transient decrease in engine air flow may compensate for the transient rise in air flow experienced when the scroll valve is opened and the exhaust manifold pressure is decreased. As one example, when the scroll valve is closed, the intake throttle opening may be temporarily increased to transiently increase the engine air flow while when the scroll valve is opened, the intake throttle opening may be temporarily decreased to transiently decrease the engine air flow.

As another example, when closing the scroll valve to increase restriction, the engine actuator may be adjusted to decrease engine dilution, to compensate for higher internal residuals due to higher exhaust manifold pressure. In comparison, when opening the scroll valve to decrease restriction, the engine actuator may be adjusted to increase engine dilution. As still another example, when timing the transitioning during the transmission event, clutch slippage and/or spark retard may be adjusted (e.g., increased) during the transitioning, the increasing based on the transitioning. Therein, the amount of clutch slippage may be increased as the transitioning of the scroll valve increases. Likewise, an amount of spark retard applied may be increased as the transitioning of the scroll valve increases.

If an upcoming transmission event is not confirmed at 1110, for example, if the duration between the transmission event and the request for transitioning restriction is larger than the threshold, at 1112, the routine includes performing the scroll valve adjustment as scheduled. This may include timing the transitioning to be before any (subsequent) transmission event.

Figure 12:
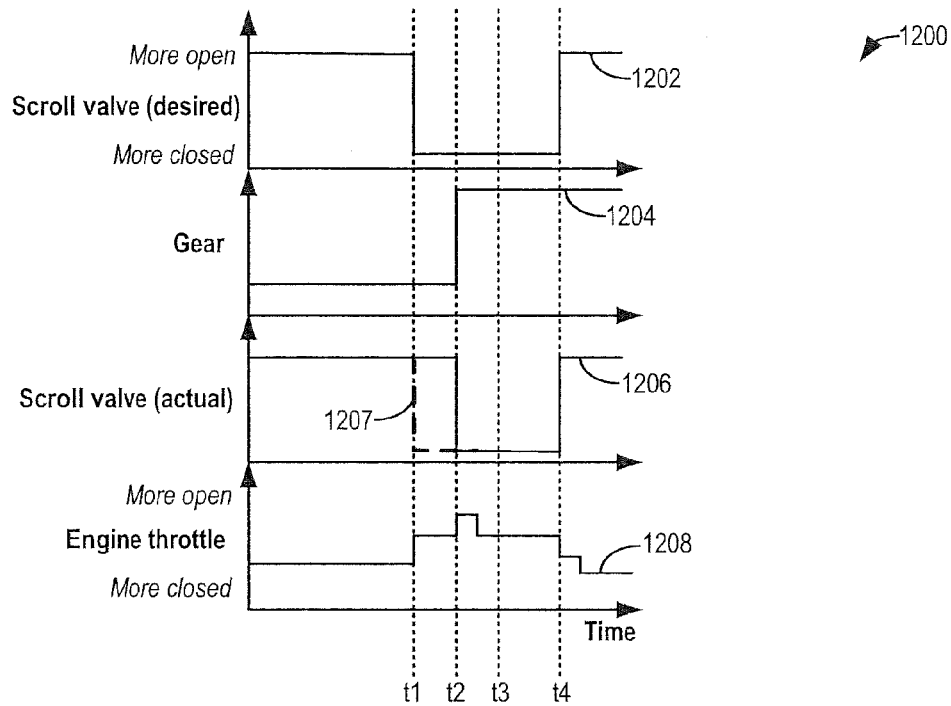
FIGS. 12-17 depict example scroll valve adjustments commanded responsive to various engine operating conditions to improve engine performance and boost response.

An example adjustment to the timing of a scroll valve transition is described with reference to FIG. 12. Specifically, map 1200 of FIG. 12 depicts a desired scroll valve schedule at plot 1202, a transmission shift schedule at plot 1204, and an actual or commanded scroll valve schedule at plot 1206. Actuator adjustments (herein intake throttle adjustments) applied during the scroll valve transition are described at plot 1208. All plots are shown over time (along the x-axis).

Prior to t1, the engine may be operating with the scroll valve more open (plot 1206). For example, the scroll valve may be fully open. Based on engine operating conditions before t1, a controller may determine at t1 that the scroll valve is to be transitioned to a more closed position (e.g., a fully closed position). For example, in response to an increase in torque demand, boost may need to be increased at or after t1. Accordingly, a scroll valve transition request (plot 1202) may be made at t1. The controller may further determine that the scroll valve adjustment needs to be performed between t1 and t3. In other words, if the scroll valve adjustment is performed after t3, engine performance will be degraded. The controller may further determine if there is an upcoming transmission event, such as where a transmission gear is engaged. Based on the engine operating conditions, it may be determined that a transmission upshift or gear engagement (plot 1204) is scheduled to start at t2. In view of the upcoming transmission event, the scroll valve transition requested at t1 may be actually commanded shortly after t2, specifically, during the transmission upshift or gear engagement. In the depicted example, the transmission upshift may be performed in multiple upshift steps and the scroll valve closing may be transitioned to occur after the first upshift step has been completed.

As such, if a transmission event is not confirmed between t1 and t3, then the scroll valve transition commanded at t1 may be actually performed at t1 (see dashed segment 1207). As another example, at t4, based on engine operating conditions, a request to open the scroll valve may be made. Since no transmission events are expected soon after t4, the controller may command the requested scroll valve transition at t4. Thus, at t4, the scroll valve may be transitioned from the more closed position to the more open position.

By timing a scroll valve transition to at least partially overlap the transmission event (as occurs between t2 and t3), driveability is improved. Further driveability improvements during scroll valve transition are achieved by engine actuator adjustments that increase engine airflow during the closing of the scroll valve. Specifically, closing of the scroll valve causes exhaust manifold pressure to rise, which in turn reduces fresh air flow into the cylinders for a few engine cycles following the closing of the scroll valve. Then, as the turbine speed picks up due to the rise in exhaust manifold pressure, boost is increased and fresh air flow to the engine cylinders increases. Thus, to compensate for the torque dip resulting from the reduced airflow, upon receiving the request for scroll valve closing and before the scroll valve is closed, specifically between t1 and t2, the opening of an intake throttle may be increased. Then, during the first few cycles following the closing of the scroll valve, specifically between t2 and t3, the intake air throttle opening may be further increased (more than the opening between t1 and t2). For example, between t1 and t2, the throttle may be partially open and between t2 and t3, the throttle may be fully open. Then, as the turbine speed and boost level picks up, specifically after t3, the intake air throttle may resume its original position.

Likewise, engine actuator adjustments that decrease engine airflow during the scroll valve transition at t4 may be used to improve driveability during scroll valve opening. Specifically, opening of the scroll valve causes exhaust manifold pressure to drop, which in turn increases fresh air flow into the cylinders for a few engine cycles following the opening of the scroll valve. Then, as the turbine speed drops due to the drop in exhaust manifold pressure, boost is decreased and fresh air flow to the engine cylinders decreases. Thus, to compensate for the torque surge resulting from the increased airflow, during the first few cycles following the opening of the scroll valve, specifically immediately after t4, an intake air throttle may be temporarily opened. For example, the intake throttle opening may be gradually increased (in the depicted example, stepwise increased). Then, as the turbine speed and boost level drops, the intake air throttle may be resume its original position (that is, the opening of the intake throttle may be increased).

Wastegate adjustments (not shown) may also be used during each of the scroll valve transitions to further assist in turbocharger control. For example, the wastegate may be opened when the scroll valve is opened and the wastegate may be closed when the scroll valve is closed. In this way, actuator adjustments may be used to improve driveability during a scroll valve transition.

In this way, a binary flow turbine may be advantageously used to improve boost control at various engine operating conditions. By adjusting the valve during cold-start conditions, increased manifold pressure can be used to expedite catalyst warm-up as well as turbine spin-up during the cold-start. In addition, scroll valve adjustments may be used to bring turbine speed out of a speed range where audible resonance can occur, improving drive feel. By adjusting the valve responsive to transient changes in torque demand, turbo lag can be reduced, improving the engine's boost response. Furthermore, by adjusting the valve responsive to engine deactivation, turbine spin-up upon engine reactivation is also improved. By adjusting the valve responsive to engine dilution, residuals can be delivered to the engine without degrading combustion, thereby extending the benefits of EGR to a wider range of operating conditions. By adjusting the valve when engine hardware limits are reached, such as responsive to pre-ignition, engine load can be quickly lowered and component damage can be reduced. By using one or more engine actuators to compensate for the torque impact of the scroll valve adjustment, the torque impact felt by a vehicle operator is reduced. In addition, by adjusting the timing based on a transmission event, the torque impact is better masked. Overall, engine performance and boost response is improved, exhaust emissions are reduced, and vehicle driveability is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
during an engine start where a turbine speed is within a threshold range determined by a controller and based on sensed turbine resonance, actuating a scroll valve coupled to an outer scroll of a twin scroll exhaust turbine to an open position via the controller and starting the engine, and adjusting opening a wastegate via a wastegate actuator coupled across the exhaust turbine based on the open position of the scroll valve.

2. The method of claim 1, further comprising, adjusting one or more of EGR, VCT, spark timing, and intake throttle position during the engine start based on the opening of the scroll valve.

3. The method of claim 1, wherein starting the engine with the scroll valve open includes moving the scroll valve to a fully open position at the engine start, a timing of moving the scroll valve based on a transmission event during the engine start.

4. The method of claim 1, wherein an opening of the scroll valve is adjusted based on each of the turbine speed and a sensed exhaust temperature.

5. The method of claim 4, further comprising direct injecting fuel to cylinders of the engine.

6. The method of claim 5, wherein an order of opening the wastegate and the scroll valve is based on an authority of the wastegate relative to the scroll valve at given engine operating conditions.

7. The method of claim 5, maintaining each of the scroll valve and wastegate open until the turbine speed is outside of the threshold range, the method further comprising, after the turbine speed is outside of the threshold range, adjusting a position of each of the scroll valve and the wastegate based on exhaust temperature.

8. A method for an engine, comprising,
during a first cold or hot start where a turbine speed is outside a threshold range, actuating a scroll valve coupled to an outer scroll of an exhaust turbine to a more closed position via a controller and starting the engine; and
during a second, different cold or hot start where the turbine speed is inside the threshold range, actuating the scroll valve to a more open position via the controller and starting the engine, wherein during each of the first and second cold or hot starts, an opening of an exhaust turbine wastegate bypassing the exhaust turbine is adjusted based on the adjusted position of the scroll valve.

9. The method of claim 8, further comprising direct injecting fuel to cylinders of the engine.

10. The method of claim 8, wherein during the first cold or hot start, the engine is started with the scroll valve more closed for a first, larger number of combustion events since engine start, and wherein during the second cold or hot start, the engine is started with the scroll valve more open for a second, smaller number of combustion events since engine start.

11. The method of claim 8, wherein the threshold range is based on one or more of manifold pressure, airflow, engine speed, estimated or measured exhaust gas temperature, and spark timing.

12. The method of claim 8, wherein the first cold or hot start includes an engine start with no indication of turbocharger resonance, and wherein the second cold or hot start includes an engine start with an indication of turbocharger resonance.

13. An engine system, comprising:
an engine with a direct fuel injector for each cylinder;
a turbocharger for providing a boosted aircharge to the engine, the turbocharger including an intake compressor and an exhaust turbine, the exhaust turbine including a first outer and a second inner scroll;
a scroll valve coupled between an engine exhaust manifold and an inlet of the first outer scroll;
a wastegate included in a bypass coupled between an inlet and an outlet of the turbine; and
a controller with computer readable instructions for,
during an engine start condition, when turbine speed is lower than a threshold, starting the engine with an opening of the scroll valve increased based on the turbine speed.

14. The system of claim 13, wherein the controller includes further instructions for, during the engine start condition, after turbine speed is higher than the threshold, decreasing the opening of the scroll valve based on exhaust temperature.

15. The system of claim 13, wherein the controller includes further instructions for sequentially opening the scroll valve and the wastegate, an order of the sequential opening based on a relative authority of the wastegate and the scroll valve.

16. The system of claim 13, wherein the controller includes further instructions for adjusting one or more of EGR, VCT, spark timing, and throttle position while adjusting the scroll valve.

17. The system of claim 13, wherein the controller includes further instructions for,
during the engine start condition, when turbine speed is higher than the threshold, starting the engine with the opening of the scroll valve decreased based on exhaust temperature.

18. The system of claim 13, wherein starting the engine with the opening of the scroll valve increased includes adjusting a timing of increasing the opening of the scroll valve based on a transmission event so that the opening of the scroll valve at least partially overlaps the transmission event.

* * * * *